US008187073B2

(12) United States Patent
Beaulieu et al.

(10) Patent No.: US 8,187,073 B2
(45) Date of Patent: May 29, 2012

(54) PERSONALIZED GAMING APPARATUS AND GAMING METHOD

(75) Inventors: Nicole Beaulieu, Reno, NV (US); Greg Schlottman, Reno, NV (US); Dwayne R. Nelson, Las Vegas, NV (US)

(73) Assignee: IGT, Reno, NV (US)

( * ) Notice: Subject to any disclaimer, the term of this patent is extended or adjusted under 35 U.S.C. 154(b) by 1092 days.

(21) Appl. No.: 11/639,465

(22) Filed: Dec. 15, 2006

(65) Prior Publication Data

US 2007/0087841 A1 Apr. 19, 2007

Related U.S. Application Data

(62) Division of application No. 10/212,598, filed on Aug. 5, 2002, now Pat. No. 7,169,052.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................. 463/16; 463/27; 463/40; 463/42

(58) Field of Classification Search .................... 463/16, 463/40, 42, 27

See application file for complete search history.

(56) References Cited

U.S. PATENT DOCUMENTS

| | | | |
|---|---|---|---|
| 4,906,853 | A | 3/1990 | Linwood et al. |
| 5,017,794 | A | 5/1991 | Linwood et al. |
| 5,027,314 | A | 6/1991 | Linwood et al. |
| 5,119,104 | A | 6/1992 | Heller |
| 5,276,496 | A | 1/1994 | Heller et al. |
| 5,326,104 | A | 7/1994 | Pease et al. |
| 5,355,222 | A | 10/1994 | Heller et al. |
| 5,387,993 | A | 2/1995 | Heller et al. |
| 5,526,357 | A | 6/1996 | Jandrell |
| 5,548,637 | A | 8/1996 | Heller et al. |
| 5,572,195 | A | 11/1996 | Heller et al. |

(Continued)

FOREIGN PATENT DOCUMENTS

| | | |
|---|---|---|
| AU | 785253 | 8/2003 |

(Continued)

OTHER PUBLICATIONS

Office Action from U.S. Appl. No. 10/062,002, Apr. 23, 2004, 15 pages.

(Continued)

*Primary Examiner* — Ronald Laneau
*Assistant Examiner* — Adetokunbo Torimiro
(74) *Attorney, Agent, or Firm* — Weaver Austin Villeneuve & Sampson LLP

(57) ABSTRACT

A system, apparatus, and method of operating a gaming apparatus may include identifying a player, accessing stored player data relating to the player, and performing a personalized gaming operation based on the stored player data. The personalized gaming operation may include one of the following personalized gaming operations: generating a video image of a game piece, the game piece having one or more characteristics selected according to the stored player data, generating a personalized video image based on the stored player data, or generating a game environment, the game environment including video images other than a video image of a game piece, music and sound effects and one or more of the video images other than a video image of a game piece, music and sound effects selected according to the stored player data.

32 Claims, 15 Drawing Sheets

U.S. PATENT DOCUMENTS

| | | | | |
|---|---|---|---|---|
| 5,586,936 | A | 12/1996 | Bennett et al. | |
| 5,752,880 | A | 5/1998 | Gabai et al. | |
| 5,752,882 | A | 5/1998 | Acres et al. | |
| 5,766,076 | A | 6/1998 | Pease et al. | |
| 6,022,273 | A | 2/2000 | Gabai et al. | |
| 6,026,304 | A | 2/2000 | Hilsenrath et al. | |
| 6,064,339 | A | 5/2000 | Wax et al. | |
| 6,084,546 | A | 7/2000 | Wax et al. | |
| 6,093,103 | A | 7/2000 | McCrea, Jr. | |
| 6,101,390 | A | 8/2000 | Jayaraman et al. | |
| 6,104,295 | A | 8/2000 | Gaisser et al. | |
| 6,104,344 | A | 8/2000 | Wax et al. | |
| 6,104,815 | A | 8/2000 | Alcorn et al. | |
| 6,108,557 | A | 8/2000 | Wax et al. | |
| 6,110,041 | A * | 8/2000 | Walker et al. | 463/20 |
| 6,112,095 | A | 8/2000 | Wax et al. | |
| 6,117,011 | A | 9/2000 | Lvov | |
| 6,142,872 | A | 11/2000 | Walker et al. | |
| 6,150,921 | A | 11/2000 | Werb et al. | |
| 6,154,139 | A | 11/2000 | Heller | |
| 6,160,986 | A | 12/2000 | Gabai et al. | |
| 6,183,362 | B1 | 2/2001 | Boushy | |
| 6,217,448 | B1 * | 4/2001 | Olsen | 463/25 |
| 6,231,445 | B1 | 5/2001 | Acres | |
| 6,232,918 | B1 | 5/2001 | Wax et al. | |
| 6,244,957 | B1 | 6/2001 | Walker et al. | |
| 6,246,376 | B1 | 6/2001 | Bork et al. | |
| 6,249,680 | B1 | 6/2001 | Wax et al. | |
| 6,254,484 | B1 | 7/2001 | McCrea, Jr. | |
| 6,290,566 | B1 | 9/2001 | Gabai et al. | |
| 6,293,866 | B1 | 9/2001 | Walker et al. | |
| 6,319,127 | B1 | 11/2001 | Walker et al. | |
| 6,350,199 | B1 | 2/2002 | Williams et al. | |
| 6,352,478 | B1 | 3/2002 | Gabai et al. | |
| 6,364,765 | B1 | 4/2002 | Walker et al. | |
| 6,567,661 | B2 | 5/2003 | McDonnell et al. | |
| 6,569,011 | B1 | 5/2003 | Lynch et al. | |
| 6,631,271 | B1 | 10/2003 | Logan | |
| 6,636,175 | B2 | 10/2003 | Russell | |
| 6,682,421 | B1 | 1/2004 | Rowe et al. | |
| 6,722,985 | B2 | 4/2004 | Criss-Puszkiewicz et al. | |
| 6,729,956 | B2 | 5/2004 | Wolf et al. | |
| 6,760,046 | B2 | 7/2004 | I'Anson et al. | |
| 6,773,344 | B1 | 8/2004 | Gabai et al. | |
| 6,778,820 | B2 | 8/2004 | Tendler | |
| 6,799,032 | B2 | 9/2004 | McDonnell et al. | |
| 6,813,499 | B2 | 11/2004 | McDonnell | |
| 6,843,725 | B2 | 1/2005 | Nelson | |
| 6,846,238 | B2 | 1/2005 | Wells | |
| 6,887,157 | B2 | 5/2005 | LeMay et al. | |
| 6,902,484 | B2 | 6/2005 | Idaka | |
| 6,912,507 | B1 | 6/2005 | Phillips et al. | |
| 6,935,949 | B1 | 8/2005 | Murphy | |
| 7,112,138 | B2 | 9/2006 | Hedrick et al. | |
| 7,169,052 | B2 | 1/2007 | Beaulieu et al. | |
| RE39,644 | E | 5/2007 | Alcorn | |
| 7,316,619 | B2 | 1/2008 | Nelson | |
| 2001/0029202 | A1 | 10/2001 | Kondo et al. | |
| 2001/0055991 | A1 | 12/2001 | Hightower | |
| 2002/0039919 | A1 | 4/2002 | Joshi et al. | |
| 2002/0042296 | A1 | 4/2002 | Walker et al. | |
| 2002/0058543 | A1 | 5/2002 | Walker et al. | |
| 2002/0142846 | A1 | 10/2002 | Paulsen | |
| 2002/0143639 | A1 * | 10/2002 | Beckett et al. | 705/26 |
| 2002/0152120 | A1 | 10/2002 | Howington | |
| 2003/0003997 | A1 | 1/2003 | Vuong et al. | |
| 2003/0036428 | A1 | 2/2003 | Aasland | |
| 2003/0038805 | A1 * | 2/2003 | Wong et al. | 345/473 |
| 2003/0045354 | A1 | 3/2003 | Giobbi | |
| 2003/0073496 | A1 | 4/2003 | D'Amico et al. | |
| 2003/0078101 | A1 | 4/2003 | Schneider et al. | |
| 2003/0120492 | A1 * | 6/2003 | Kim et al. | 704/270 |
| 2003/0148808 | A1 * | 8/2003 | Price | 463/27 |
| 2003/0148809 | A1 | 8/2003 | Nelson | |
| 2003/0148812 | A1 * | 8/2003 | Paulsen et al. | 463/42 |
| 2004/0023709 | A1 | 2/2004 | Beaulieu et al. | |
| 2004/0132530 | A1 | 7/2004 | Rutanen et al. | |
| 2004/0162129 | A1 | 8/2004 | Nelson | |
| 2005/0043072 | A1 | 2/2005 | Nelson | |
| 2005/0059485 | A1 | 3/2005 | Paulsen et al. | |
| 2006/0177109 | A1 | 8/2006 | Storch | |
| 2007/0099697 | A1 | 5/2007 | Nelson | |
| 2008/0051198 | A1 | 2/2008 | Nelson | |

FOREIGN PATENT DOCUMENTS

| | | |
|---|---|---|
| AU | 2003200397 | 8/2003 |
| AU | 2003256490 | 2/2004 |
| DE | 10393026 T5 | 8/2005 |
| EP | 0 992 265 | 4/2000 |
| EP | 1 197 251 | 4/2002 |
| EP | 1 291 830 | 3/2003 |
| GB | 2385003 | 10/2005 |
| GB | 2406526 | 10/2006 |
| GB | 2385280 | 12/2006 |
| GB | 2423033 | 12/2006 |
| WO | 9830297 | 7/1998 |
| WO | 0148713 | 7/2001 |
| WO | 0154091 | 7/2001 |
| WO | 01/74464 | 10/2001 |
| WO | 01/99067 | 12/2001 |
| WO | 02/17251 | 2/2002 |
| WO | 0232517 | 4/2002 |
| WO | 02/077935 | 10/2002 |
| WO | 02103586 | 12/2002 |
| WO | 03005743 | 1/2003 |
| WO | 03/015042 | 2/2003 |
| WO | 03/025808 | 3/2003 |
| WO | 03/025828 | 3/2003 |
| WO | 03025828 | 3/2003 |
| WO | 03/060846 | 7/2003 |
| WO | 2004/012833 | 2/2004 |

OTHER PUBLICATIONS

Office Action from U.S. Appl. No. 10/212,598, Mar. 20, 2006, 7 pages.
Notice of Allowance dated Sep. 19, 2006 from U.S. Appl. No. 10/212,598.
Examination Report in Australian Patent Application No. 2003256490 dated Mar. 6, 2006.
Examination Report from Foreign Application No. GB0302331.4, Jan. 28, 2005, 2 pages.
Combined Search and Examination Report from Foreign Application No. GB0609584.8, Jun. 13, 2006, 5 pages.
Versus Technology, Inc., Eagle Eye/Eagle Eye Network; "Turn your access control system into a real-time asset tracking system," printed: Aug. 2001; pp. 1-8; website: www.versustech.com/eagleeye.html.
SpaceDaily; "PinPoint Asset Management Via GPS," published: Oct. 1998; pp. 1-5; website: www.spacer.com/news/gps-98m.html.
Office Action from U.S. Appl. No. 10/954,603, dated Feb. 8, 2007, 6 pages.
Final Office Action from U.S. Appl. No. 10/954,603, Jul. 26, 2007, 7 pages.
Notice of Allowance and Notice of Allowability from U.S. Appl. No. 10/954,603, Oct. 5, 2007, 6 pages.
Examination Report from Australian application No. 2006202033, dated Jan. 4, 2008, 7 pages.
Office Action from U.S. Appl. No. 10/972,830, May 7, 2007, 20 pages.
Final Office Action from U.S. Appl. No. 10/972,830, Sep. 28, 2007, 21 pages.
Office Action from U.S. Appl. No. 11/564,231, Mar. 20, 2009.
Office Action from U.S. Appl. No. 10/972,830, Apr. 28, 2008.
Final Office Action from U.S. Appl. No. 10/972,830, Nov. 3, 2008.
Final Office Action from U.S. Appl. No. 10/972,830, May 11, 2009, 21 pages.
International Search Report dated Nov. 7, 2003 from corresponding Application No. PCT/US2003/21685.
Anich Jesdanun, Personal Wireless Internet Tracking Devices Coming Soon.
Christine Blank, 1,000 Redeem Wireless Coupons During CompUSA Experiment, Apr. 9, 2001.
Versus Technology, Inc., Jul. 26, 2001, http://www.visualtech.com/locating.htm, pp. 1-2.

PinPoint Asset Management Via GPS, Oct. 6, 1998, http://www.spacer.com/news/gps-98m.html, pp. 1-4.
GPS Personal Locator, 2002, pp. 1-2.
International Search Report dated Jun. 17, 2005 from corresponding Application No. GB/0502534.1.
Office Action dated Aug. 25, 2009 from U.S. Appl. No. 11/564,231.
Restriction Requirement from U.S. Appl. No. 10/212,598 dated Dec. 15, 2005.
Ex Parte Quayle Action from U.S. Appl. No. 10/072,277 dated Feb. 24, 2004.
Notice of Allowance from U.S. Appl. No. 10/072,277 dated Jun. 23, 2004.
Ex Parte Quayle Action from U.S. Appl. No. 10/954,603 dated Sep. 28, 2006.
Pre-Brief Appeal Conference Decision from U.S. Appl. No. 11/564,231 Jan. 13, 2010.
Final Office Action from U.S. Appl. No. 11/564,231 dated Aug. 25, 2009.
Final Office Action from U.S. Appl. No. 10/972,830, Nov. 9, 2009.
Office Action from U.S. Appl. No. 10/972,830, Mar. 19, 2010.
Examination Report from Australian Application No. 2003200397, dated May 20, 2005.
Examination Report from Australian Application No. 2006202033, dated Oct. 24, 2006.
Examination Report from Australiain Application No. 2008203314, dated Mar. 22, 2010.
Search Report from Foreign Application No. GB0302688.7 dated Jun. 9, 2003.
Examination Report from Foreign Application No. GB0302688.7 dated Feb. 8, 2005.
Examination Report from Foreign Application No. AU29241/02 dated Sep. 12, 2005.
Search Report from Foreign Application No. GB0302331.4, Jun. 16, 2003.
Examination Report from Foreign Application No. GB0302331.4, Aug. 22, 2005.
Examination Report from Foreign Application No. GB0302331.4, Nov. 29, 2005.
"Locating People," Versus Technology, Inc., Jul. 26, 2001, 2 pages.

* cited by examiner

FIG. 11
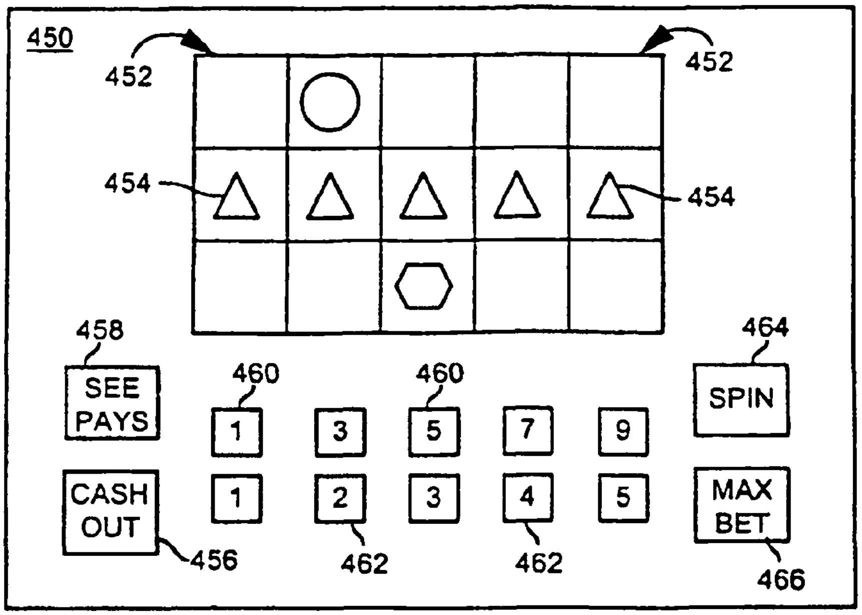
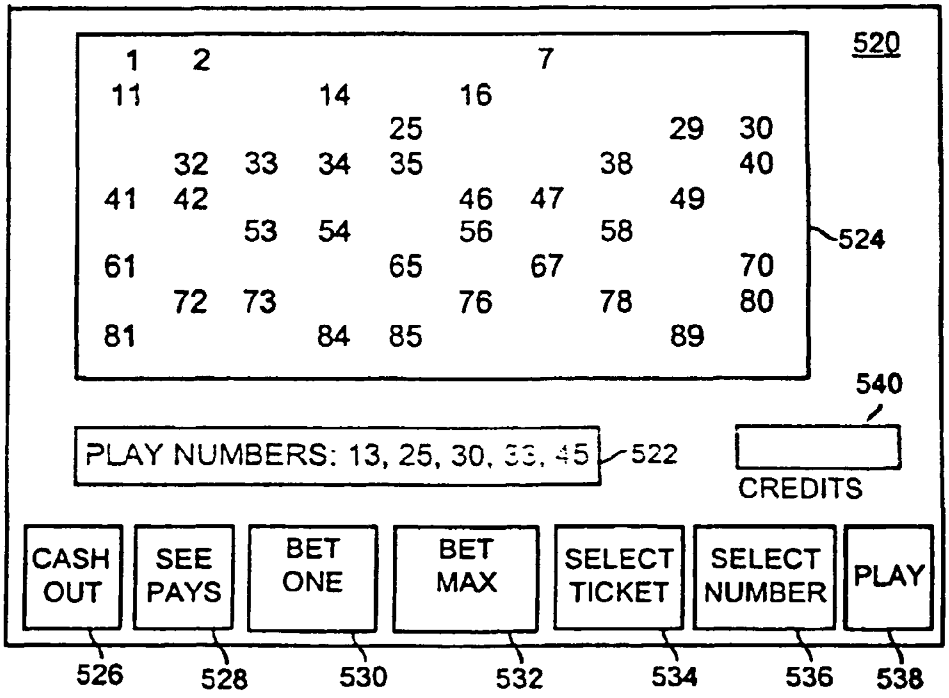
FIG. 12

PERSONALIZED GAMING APPARATUS AND GAMING METHOD

CROSS REFERENCE TO RELATED APPLICATION

This application is a divisional of U.S. patent application Ser. No. 10/212,598, now issued as U.S. Pat. No. 7,169,052, entitled "PERSONALIZED GAMING APPARATUS AND GAMING METHOD" filed Aug. 5, 2002 which is incorporated herein by referenced.

BACKGROUND

The invention is directed to a gaming apparatus and a method of gaming, and in particular to a personalized gaming apparatus and a method of personalized gaming.

Many gaming system operators offer a voluntary player tracking system as part of their services. In return for permitting the gaming system operator to track the performance of the gaming units the player uses, the player is awarded points dependant upon the player's use. For example, the player may be awarded a certain number of points every time the player wagers a certain level of value (e.g., $1000). The player may redeem the points with the gaming system operator for premium gifts, such as clothing and the like. Alternatively, the points may be redeemed for value.

As part of such a system, the player is assigned an identifier that the player enters into a gaming unit input device before he or she begins to play. For example, the player may be assigned a Personal Identification Number (PIN) that the player enters into the gaming unit using an associated key pad. Alternatively, the player may have a player tracking card that the player swipes through a card reader to transfer the identifier to the gaming unit.

Once the player has identified him or herself to the gaming unit, the gaming unit is ready to transfer data about the player's use of the gaming unit. The gaming unit may, for example, transfer this data to a central server. The central server receives the data transmitted by the gaming unit, and uses the data to update a record associated with the identifier. The record may include a total of the value wagered by the player to date and the number of points awarded. Alternatively, the gaming unit may transfer the data about the amount wagered to a storage device on the card.

Other data besides the value wagered may be transferred from the gaming unit for storage. For example, data may be transferred from the gaming unit concerning the types of games played and the amount of value wagered on each game. Other data about the player's wagering patterns may be transferred as well.

Eventually, the player will redeem the earned points for a premium gift or the like. In such a case, the player takes his or her card (or PIN) to a designated kiosk, window or counter. An employee of the gaming system operator uses the card (or PIN) to access the player's record, and makes a deduction from the player's accumulated point total in an amount equal to that set for the premium gift that the player wishes to receive. The gaming system employee presents the player with the gift, and the transaction is complete.

PCT Publication No. WO 01/74464 states that a storage device may be used to permit a player to "pause" a game being played on a gaming unit that is programmed to play a game which simulates a sporting event, such as boxing or football. It is stated that a memory device, such as a card, may be used to store data which will be utilized to reconstruct the gaming conditions (including value remaining) that existed when the player made the decision to leave the gaming unit. It is further stated in WO 01/74464 that the stored data may be used to permit the player to build "status." An example is given with reference to sports such as horse racing and auto racing. Specifically, it is stated that the player may be allowed to "build up a stable of horses or a team of automobiles that would be managed over time by the player."

BRIEF DESCRIPTION OF THE DRAWINGS

FIG. 11 is an illustration of an embodiment of a visual display that may be displayed during performance of the slots routine of FIG. 13;

FIG. 12 is an illustration of an embodiment of a visual display that may be displayed during performance of the video keno routine of FIG. 14;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. .sctn. 112, sixth paragraph.

Figure 1:
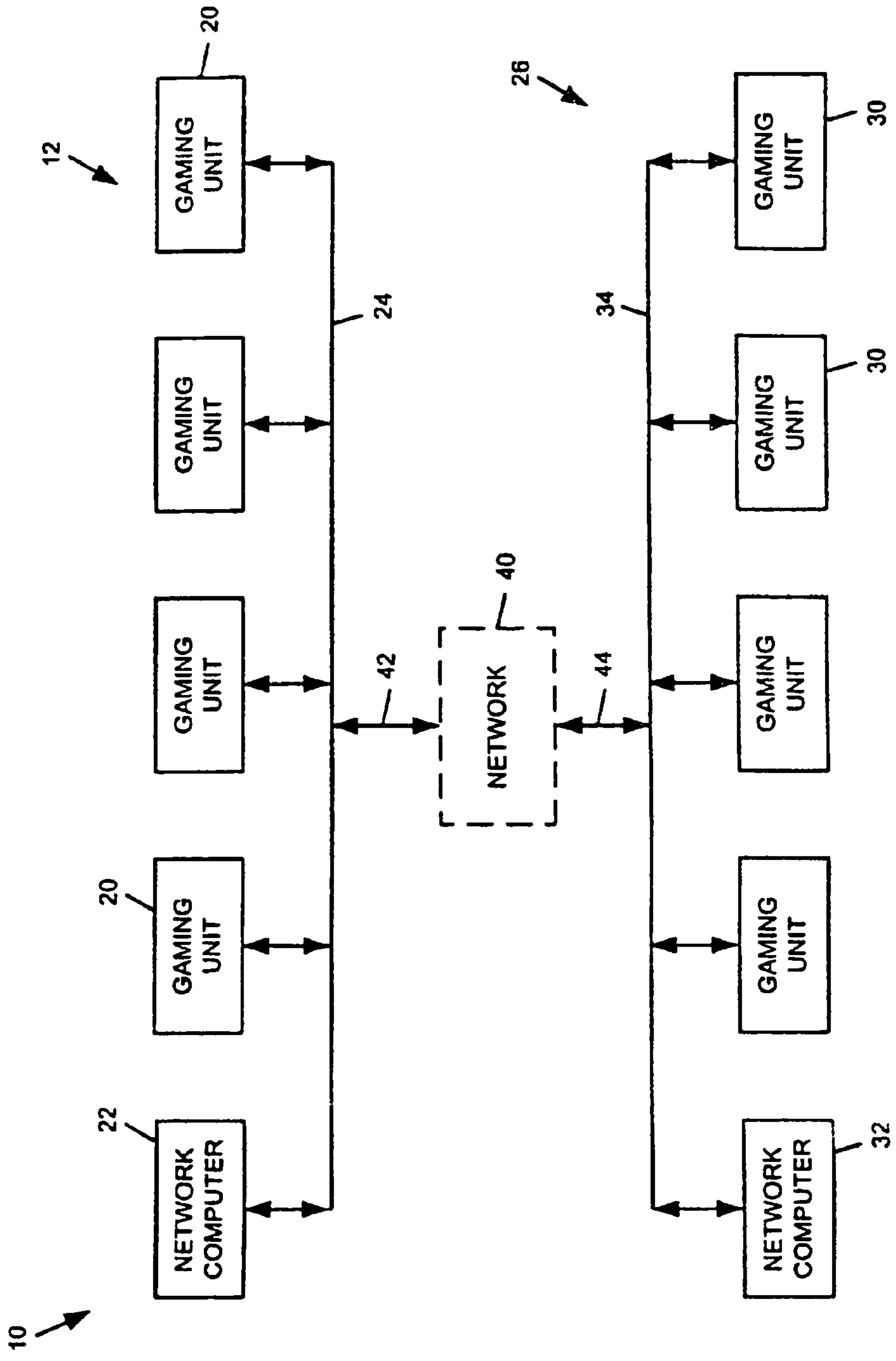
FIG. 1 is a block diagram of an embodiment of a gaming system in accordance with the invention.

FIG. 1 illustrates an embodiment of a gaming system 10 in accordance with the invention. Referring to FIG. 1, the gaming system 10 may include a first group or network 12 of gaming units 20 operatively coupled to a network computer 22 via a network data link or bus 24. The gaming system 10 may include a second group or network 26 of gaming units 30 operatively coupled to a network computer 32 via a network data link or bus 34. The first and second gaming networks 12, 26 may be operatively coupled to each other via a network 40, which may comprise, for example, the Internet, an intranet, a wide area network (WAN), or a local area network (LAN) via a first network link 42 and a second network link 44.

The first network 12 of gaming units 20 may be provided in a first gaming system, and the second network 26 of gaming units 30 may be provided in a second gaming system located in a separate geographic location than the first gaming system. For example, the two gaming systems may be located in different areas of the same building, city, or state or they may be located in different buildings, cities, or states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Moreover, the network computers 22, 32 may not only be a server computers, but they may operate as gaming units as well. In this regard, U.S. patent application Ser. No. 09/595,798 to Brosnan et al., filed Jun. 16, 2000, is incorporated herein in its entirety by reference.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links. As another alternative, a peer-to-peer network may be used, in which case there would be no need for the network computers 22, 32 because the gaming units 20, 30 would instead share the processing handled by the network computers 22, 32 in the gaming system 10 as illustrated.

Gaming Unit

Figure 2:
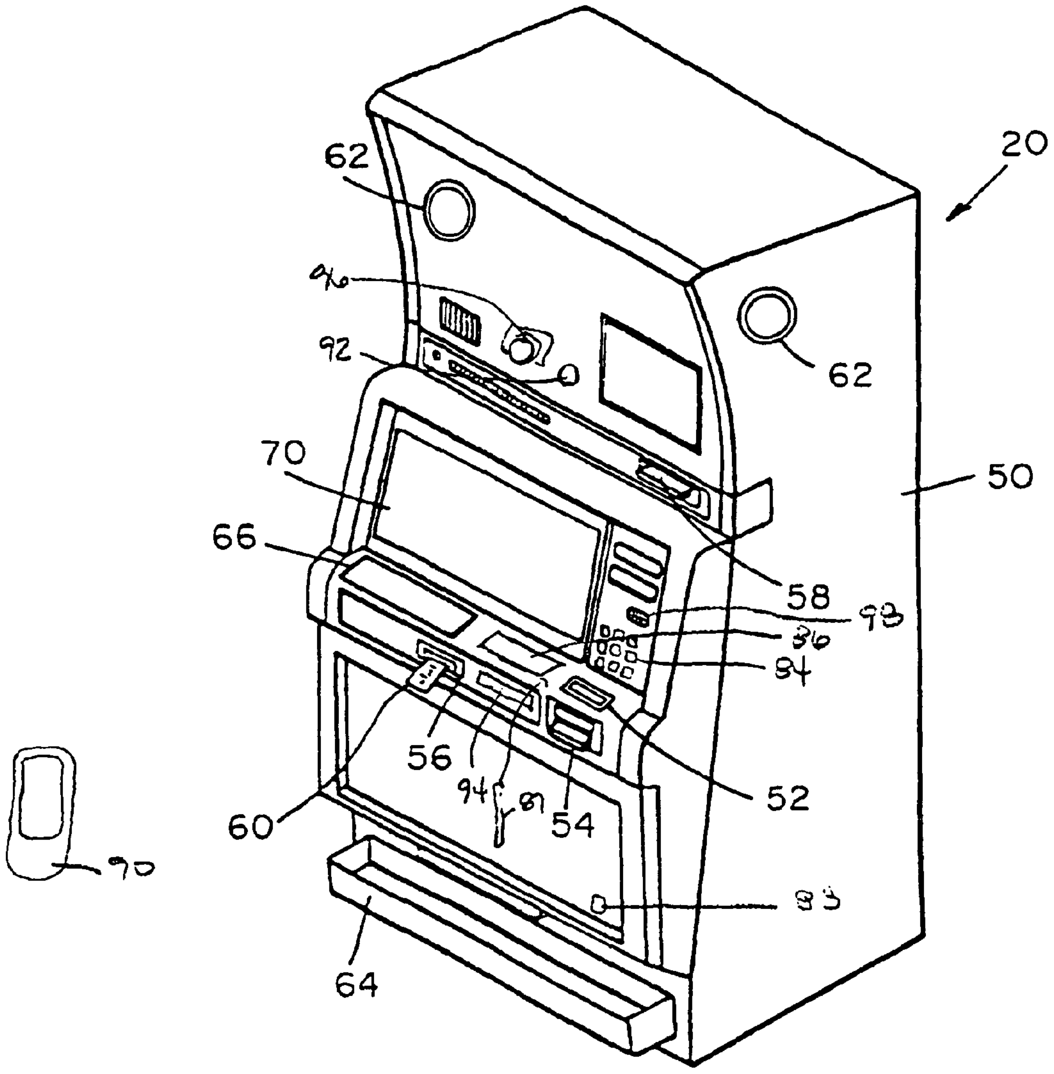
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of gaming unit and may have various different structures and methods of operation. For exemplary purposes, various designs of the gaming units 20 are described below, but it should be understood that numerous other designs may be utilized.

Referring to FIG. 2, the gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass money denominations or credits, and may be in the form of gaming tokens, coins, paper currency, ticket vouchers, electronic vouchers (stored, for example, on a smart card or PDA (Personal Digital Assistant)), credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the gaming system operator name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, a control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a game. The control panel 66 may be provided with a plurality of input devices in the form of pushbuttons or touch-sensitive areas that may be pressed by a player to select games, make wagers, make gaming decisions, etc.

Figure 2A:
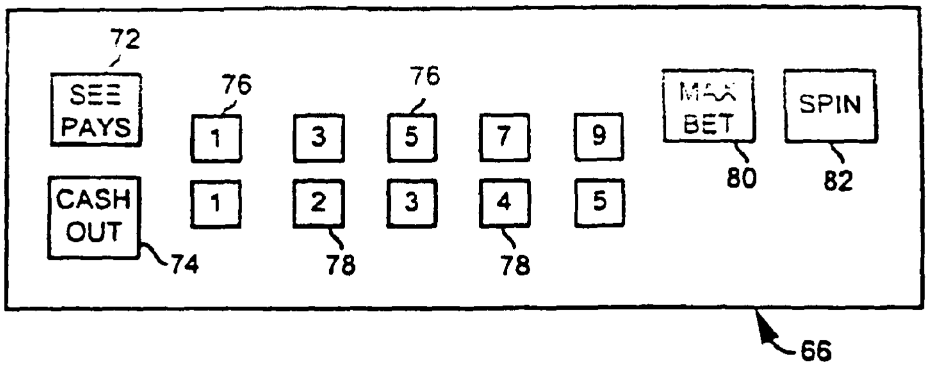
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that the rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Other input devices may be used as part of, in conjunction with or in substitution for the control panel 66 shown. For example, other input devices may include alpha-numeric key boards, joysticks, computer mice, track balls, etc. These input devices may be designed for use with a particular type of gaming unit 20, 30, or may be usable with many different types of gaming units 20, 30.

As noted above, the gaming unit 20 may include an identification input device by which the gaming unit 20 may determine the identity of the player. In particular, the card reader 58 may be used to read a card that carries an identification code that is associated with the player. The gaming unit 20 may also include identification input devices such as a keypad 84, an input pad 86 (with optional stylus 87), an input port 88 adapted to communicate via a wired link (via a USB cable, for example) or wireless link (radio frequency or infrared link, for example) to a Personal Digital Assistant (PDA), cellular phone or the like 90, a digital camera 92, a scanner 94, a retinal (or iris) scanner 96, and/or a microphone 98. The gaming unit 20 may include any one of the devices 58, 84, 86, 88, 90, 92, 94, 96, 98, or the gaming unit 20 may include a combination of some or all of the devices 58, 84, 86, 87, 88, 90, 92, 94, 96, 98.

In operation, a player may identify him or herself to the gaming unit 20 by entering a unique numeric or alpha-numeric code using the key pad 84, for example. Alternatively, the player may use his or her finger or the stylus 87 to sign his or her signature on the input pad 86. The pad 86 and/or stylus 87 may include instrumentation to record such characteristics as position, form, speed, and/or pressure as the player signs his or her signature. As a further alternative, the player may sign his or her signature on the PDA 90, which signature is then converted to electronic data, and the data is then transferred via the input port 88 to the gaming unit 20. As yet another alternative, the player may sign his or her signature on a piece of paper that is then photographed using the digital camera 92 or scanned using the scanner 94 to convert the signature into electronic data. As an additional alternative, the scanner 94 may be adapted to permit the player may place one of his or her fingers or his or her hand on the scanner 94 and to generate an electronic data representation of the fingerprint on one or more of the player's fingers or an electronic data representation of the pattern of the entire hand. Alternatively, the camera 92 may be used to take a picture of the player, the picture then being converted into electronic data. As a still further alternative, the player may place his or her eye up to the retinal (or iris) scanner 96, and the retinal (or iris) scanner 96 may generate an electronic data representation corresponding to the pattern of the retina (or iris) of the player. As yet another alternative, the player may speak into the microphone 98, and characteristics of the spoken words (or voiceprint) may be converted into an electronic data representation.

As was the case with the control panel 66, other equipment may also be used in conjunction with or in substitution for the identification input devices 84, 86, 88, 90, 92, 94, 96, 98. For example, rather than using a stylus 87, a computer mouse or glove may be used. Additionally, thermal imaging equipment may be included or substituted. Moreover, a touchscreen may be integrated with the display unit 70, and used in place of the input pad 86.

Gaming Unit Electronics

Figure 3:
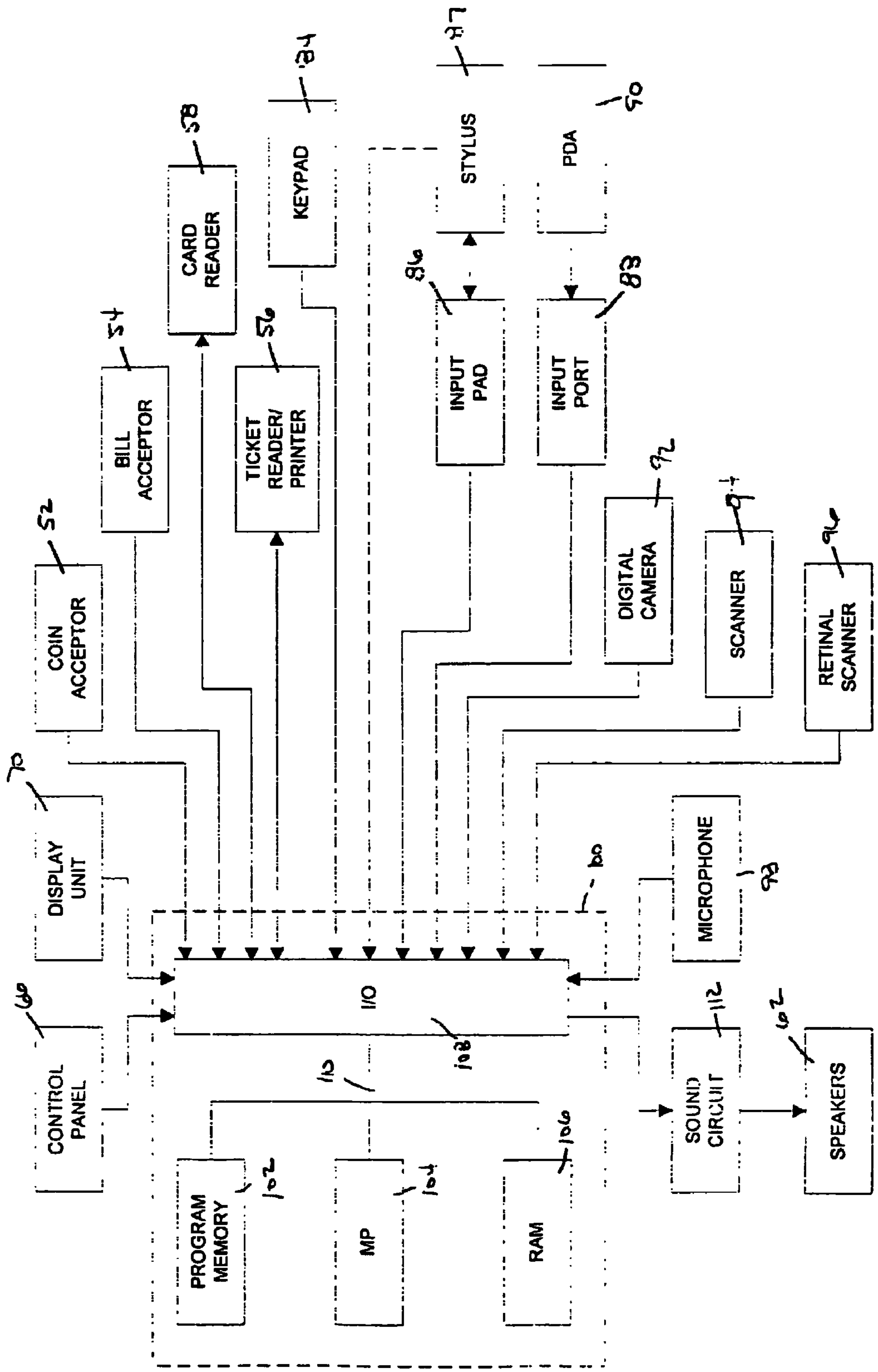
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the coin acceptor 52, the bill acceptor 54, the ticket reader/printer 56, the card reader 58, the control panel 66, the display unit 70, the keypad 84, the input pad 86 (and optionally the stylus 87), input port 88, the digital camera 92, the scanner 94, the retinal scanner 96 and the microphone 98 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, 84, 86, (87), 88, 92, 94, 96, 98, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108. In fact, several connection schemes and systems are discussed in U.S. patent application Ser. No. 09/642,192 to Le May et al., filed Aug. 18, 2000 and incorporated herein in its entirety by reference.

Personalization Routine

One manner in which one or more of the gaming units 20 (and possibly one or more of the gaming units 30) may operate is described below in connection with a number of flowcharts which represent a number of portions or routines of one or more computer programs that may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. By storing the computer program portions therein, various portions of the memories 102, 106 are physically and/or structurally configured in accordance with computer program instructions.

The computer program portions may be written in any high-level language such as C, C++, C# or the like or any low-level, assembly or machine language. The computer program portions may be written in a browser-based language such as Java, ActiveX or the like. The computer program portions may also be written in a scripting language, like JavaScript, for example. In summary, all manner of languages may be used.

Figure 4A:
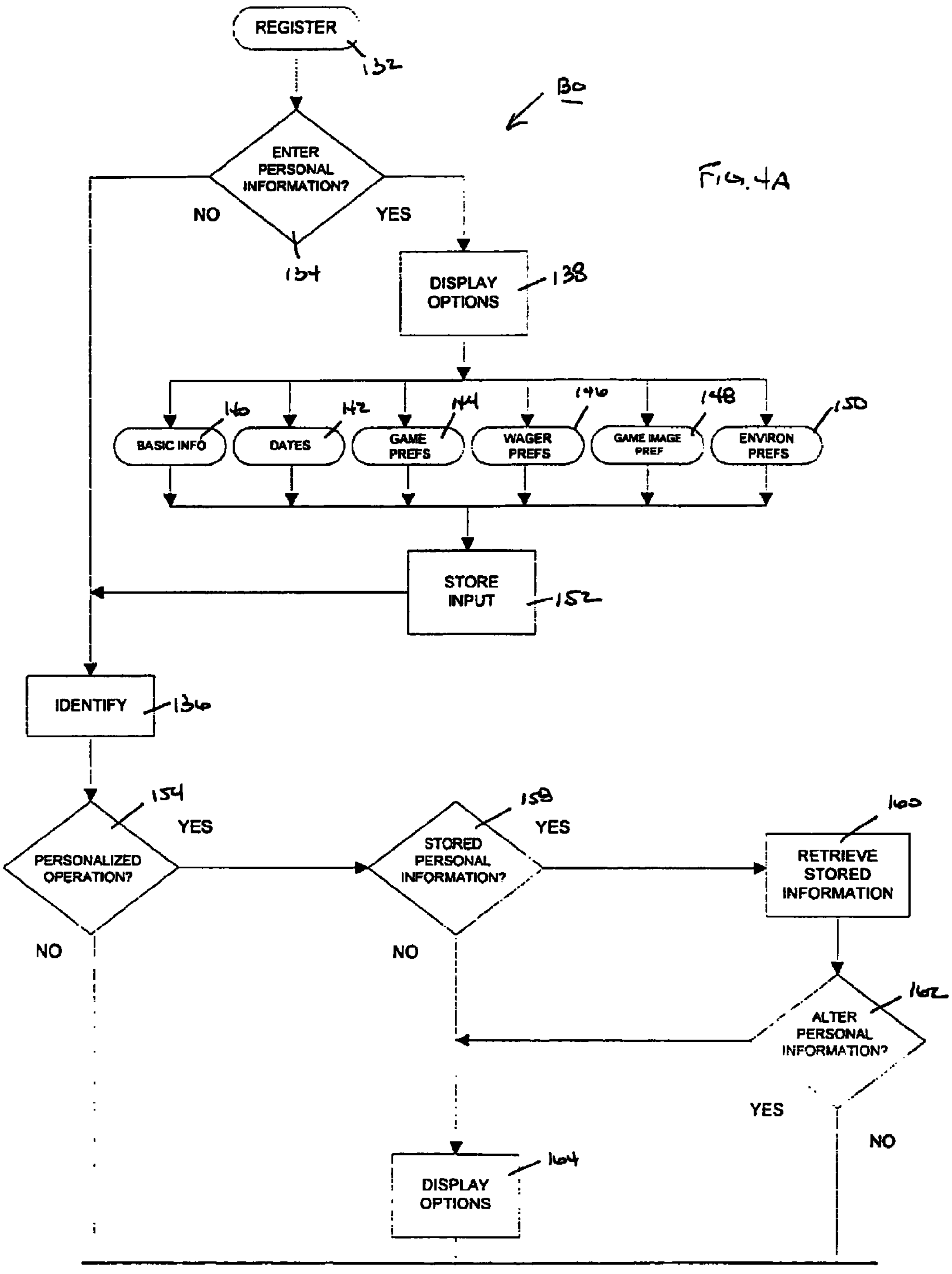
FIG. 4 is a flowchart of a gaming unit personalization routine in accordance with the invention that may be performed during operation of the gaming system of FIG. 1.
Figure 4B:
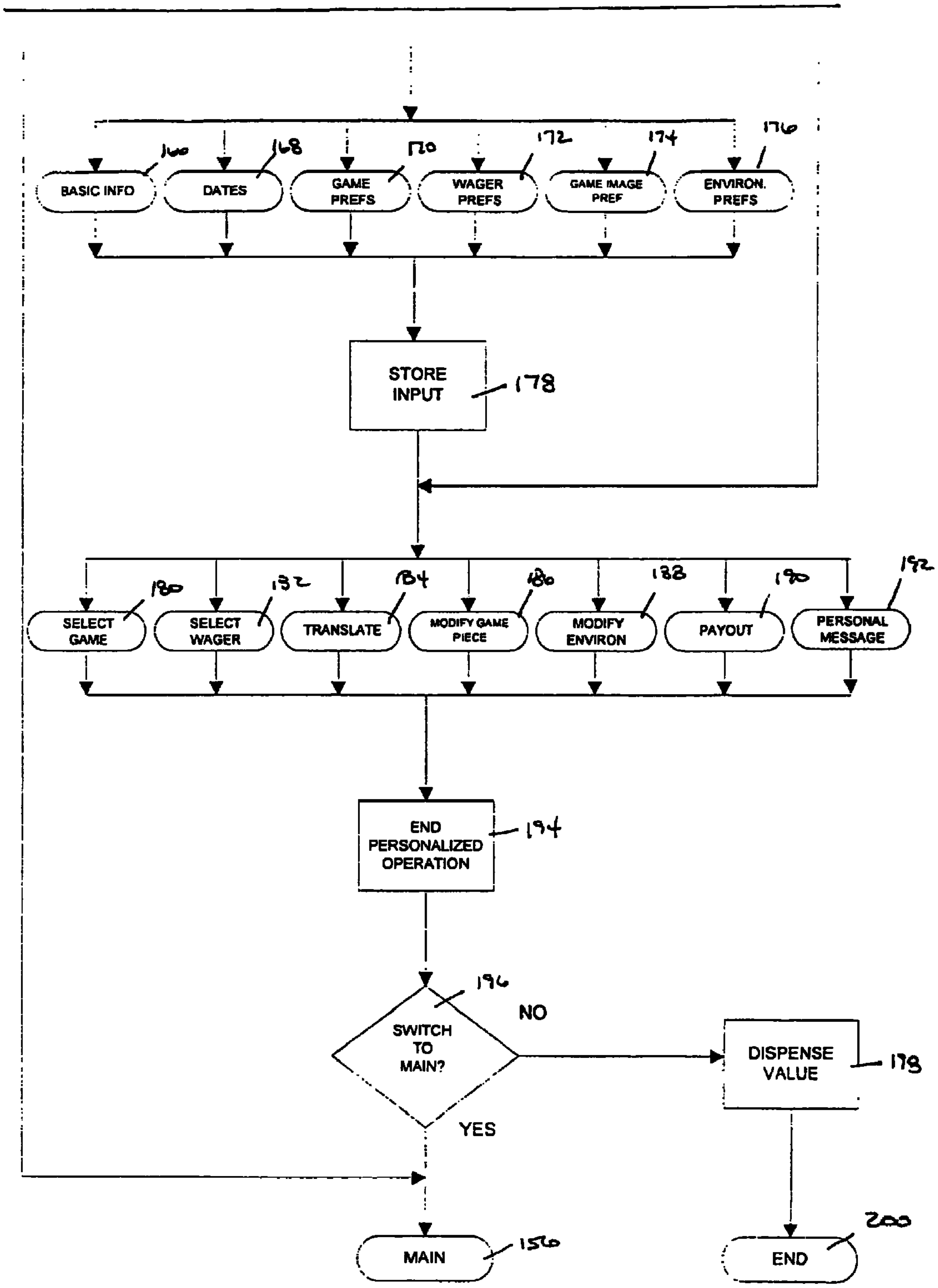

FIG. 4 is a flowchart of a gaming unit personalization routine 130 that may be stored in the memory of the network computer 22. Referring to FIG. 4, the personalization routine 130 may begin operation at block 132 with registration. During registration, a player creates or is assigned an identifier for use with the system 10.

An identifier may be created or assigned according to any of the following methods, although other methods are possible. Employees of the system operator may assign tracking cards to the players, each tracking card having an identifier established prior to or at the time of distribution. The player enters the identifier into the system 10 by swiping the card through the card reader 58, for example. Alternatively, the system operator employees may assign a PIN to the player, and the player may enter the PIN using the key pad 84 to alert the system 10 to his or her use of a specific gaming unit 20, 30. As a further alternative, the player may select the PIN him or herself, and the system 10 may verify that the PIN thus selected is unique before permitting the player to use the PIN. As yet another alternative, the player may provide a handwriting sample, whether by a form that is scanned into the system 10 or directly through the use of an input pad and stylus, for example. Similarly, the player may provide a fingerprint, hand print, voice print, retinal print or iris print via some type of scanner. The player would later be able to enter the identifier via the input pad 86, scanner 88, retinal scanner 96 or microphone 98 to alert the system 10 as to the gaming unit 20, 30 that he or she is using, as explained in greater detail below.

A player may be uniquely associated with an identifier. That is, one and only player may be associated with one and only one identifier. Identifiers relying on biometric data (fingerprints, iris or retinal prints, voice prints) are particularly well suited for such an assignment. In this case, all of the preference data associated with the identifier are associated with the player assigned to the identifier, although some of the preference data may indicate participation in player groups (such as "high roller" status).

Other associations are possible, however. For example, a player may have more than one identifier. In such a case, the player may assign different preference data to each of the identifiers, creating separate "profiles" for him or herself. For example, a player may have one profile for use with slot machines, another for video poker machines, and so on. By entering a different identifier into the gaming unit 20, 30, the player may shift between profiles.

As another alternative, more than one player (i.e., a group of players) may be assigned to a single identifier. In this fashion, the identifier may serve as a "group" identifier. This group identifier may then be used to provide members of the group a single profile applicable to all members of the group. As just one example, a group identifier may be established for persons requiring a special form of assistance, such as all visually-challenged persons. The profile (i.e., set of preference data) associated with the group identifier may modify the operation of the gaming unit 20, 30 (e.g., increase the game piece image size, use starkly constrasting color schemes) for members of the group.

Registration may occur at a variety of locations. For example, an employee of the gaming system operator may register players at a specific location set up for this purpose (e.g. at the concierge desk), or may "roam" the floor to perform this service wherever the player is located. Alternatively, the player may register him or herself over the Internet before entering the casino, at a kiosk established for registration at the casino, or at gaming units 20, 30 adapted to permit registration to occur.

Depending upon the type of identifier assigned, after registration at block 132, the system 10 may permit the player to enter personal data about him or herself at block 134. The player may elect not to or may not be permitted to enter any data particular to him or herself at this time, in which case the method may proceed to block 136. If the player wishes to to enter data into the system 10 to be stored, for example, at either of the network computers 22, 32 or to a portable device, such as a card or PDA, the method may proceed to block 138, where a video image may be displayed indicating the various forms of data that may be entered into the system.

For example, the video image may prompt the player to enter data regarding his or her name, address, nationality, and language skills, which data may be entered at block 140. Data concerning the player's participation or inclusion in a "high-rollers" club may also be-entered at block 140. Data regarding dates of personal significance, such as birthdays, anniversaries, etc. may be entered at block 142. The player may enter data about favorite games at block 144, or preferred single game/spin/hand wager amounts or wager denominations at block 146.

Additionally, the player may enter data regarding his or her preferences at block 148 as to the appearance of game pieces to be displayed for one or more games including video poker, video blackjack, video slots, video keno and video bingo. For instance, the player may choose to enlarge the game piece images, i.e. change the dimensions of the playing cards, reel symbols, keno cards, and/or bingo cards. In regard to video poker and video blackjack, the player may select a particular image to be displayed on the card backs that is not the default image displayed by the system 10. In fact, the player may be provided with the option to upload a card back image from a portable storage device, such as a PDA, to the system 10. The player may be permitted to select different images for the appearance of the face cards, or to upload an image for this use as well. In regard to video slots, the player may select a set of slot symbols that are different than the default set, or may change the color of the slot symbols. In regard to video keno and video bingo, the player may change the color or the background of the keno card or the bingo card, and may upload images for this purpose.

Further, the player may enter data regarding his or her game environment preferences at block 150. For example, the player may be permitted to change the color of the background that will be displayed behind the game pieces, or to change the background to a photograph or picture that may be uploaded from a memory storage device, such as a PDA. Also, the player may be permitted to select the sound effects and/or music (compositions or collections of notes) that will be played during the game, or the volume level of the sound effects and/or music. The player may also be permitted to enter preferences for the input device response characterics (such as sensitivity, activation speed, etc.).

The data entered at blocks 140, 142, 144, 146, 148, 150 may be stored in one or more records at, for example, the network computers 22, 32 or to a portable device (such as a card with a magnetic strip, smart card or PDA) at block 152. For example, a personal data record may contain such data as the name, address, nationality, language skills and/or status (e.g., "high-roller") of the player. The personal data record may also contain the data on personal dates, such as birthdays, anniversaries, and other occasions. A gaming record may contain data on the player's favorite games and preferences as to game piece and game environment characteristics (images, sound effects, music, etc.). Further, a wager record may contain data about the wagering preferences of the player associated with the identifier. After block 152, the method may proceed to block 136.

At block 136, the player may alert the system 10 to his or her use of a particular gaming unit 20, 30 by entering the identifier into the system via one of the gaming units 20, 30. The identification may be made by using any of a variety of mechanisms, including one or more of the following: the card reader 58, the keypad 84, the input pad 86 (and the stylus 87), the input port 88 (and the PDA 90), the digital camera 92, the scanner 94, the retinal (or iris) scanner 96, and/or the microphone 100. As stated above, any of these devices may be used to sample and generate a representation, in the form of electronic data, of a unique characteristic of the party (Personal Identification Number (PIN), signature, fingerprint, voice print, appearance, etc.) wishing to identify themselves to the system 10. The electronic data representation of the unique characteristic may then be compared with stored data.

For example, using the stylus 87, a signature may be entered on the input pad 86. The signature may be captured using electronic signature capture software, and converted into electronic data. The electronic data may then optionally be routed to electronic signature authentication software.

The signature capture software and the signature authentication software may be co-located at the gaming unit 100, or, alternatively, the signature authentication software may be located remotely from the signature capture software. If the signature capture software and the signature authentication software are located remotely, then the electronic data may be encrypted before transmission and decrypted afterward.

The signature authentication software may determine if the electronic data falls within the authentication parameters of electronic data representing a signature in an electronic signature database. The comparison may be made using matching or pattern recognition techniques. The authentication parameters may be varied according to legal standards for authenticating "electronic signatures," according to industry custom and practice and/or according to gaming system operator preferences.

A determination may then be made at block 154 as to whether the player that has identified his or herself wishes to have the gaming unit 20, 30 perform personalized operation. For example, a video image may be displayed on the display unit 70 prompting the player to activate an input device if he or she desires personalized operation. The input device may be a pushbutton on the control panel 66 that is assigned to other operations (such as the "See Pays" button 72), or that is assigned to only the personalized operation (such as an "Options" or "Personalization" button). If the player does not depress the button within a certain time period, for example thirty seconds, then the determination is made that the player does not desire personalized operation, and the routine may proceed to block 156, wherein a main routine is performed that is independent of the player's personal data and that is explained in greater detail below. If the player depresses the button, the method may proceed to block 158.

At block 158, the system 10 (for example one of the network computers 22, 32) may determine if the identifier associated with the player is already associated with one or more stored data records. In this sense, a data record associated with a group of players may be considered to be a personal data record for purposes of discussion. If the identifier is associated with one or more stored data records, the routine may proceed to block 160, and the data records associated with the player's identifier are retrieved. The routine may then proceed to block 162, where a determination is made as to whether the player wishes to enter or is permitted to enter new data or update/change the data already stored.

If the determination is made at block 158 that there are no stored data records associated with the identifier entered or at block 162 that the player wishes to update/change the data in one or more of his or her data records and is permitted to do so, then at block 164 a video image may be displayed showing the types of data that may be stored, similar to block 158. The player may then enter data at blocks 166, 168, 170, 172, 174, 176, blocks 166, 168, 170, 172, 174, 176 being similar to blocks 140, 142, 144, 146, 148, 150 described above, although this need not be the case. The data which may be entered after registration (block 132) may be different than the data entered when the player first makes use of a gaming unit. After the data is entered/updated/changed, the data is stored at block 178.

The routine may proceed from either block 162 or block 178 to blocks 180, 182, 184, 186, 188, 190, 192 where personalized operation may be provided according to the data stored in the data records.

For example, at block 180, the controller 100 of the gaming unit 20, 30 may automatically select a game for the player from the group of games consisting of video poker, video blackjack, video slots, video keno, and video bingo according to the gaming record associated with the identifier. Further, the controller 100 may automatically select a wager or set wager denominations for the player at block 182 according to the wager record associated with the identifier.

Also, the controller 100 may control the display unit 70 to generate a video image at block 184 wherein the text displayed is personalized. For example, a video image may be generated wherein the text is displayed in a second language and/or a second character set different from a first language and/or first character set according to data contained in the personal data record. In one such case, where the default is for the text to be displayed in English, the controller 100 may control the display unit 70 to generate a video image wherein the text is displayed in another language, such as French, German, Arabic, Chinese, or Japanese, according to the personal data record associated with the identifier. The operation at block 184 may further include the generation of captions in addition to or in substitution for speech, sound effects and/or music according to the personal data record.

At block 186, the controller 100 may control the display unit 70 to alter the appearance of the video images, such as the game piece images, generated by the display unit 70. For example, where the game is a playing card game like video poker or blackjack, the playing card dimensions may be enlarged, the face card appearance of the king, queen and jack may be changed from one style (Tudor) to another (Ottoman), and/or the card back appearance may be changed. If the game is a slot game, then the reel symbol or payline appearance and/or color may be changed. Similarly, for games such as keno and bingo that use tickets or cards, the color and/or background of the cards may be changed as may the indicia (numbers, markers, spots) displayed on the card. In particular, contrasting colors may be used according to the personal data record to permit the visually-challenged to view the video images more easily. These changes may be to elements of the base game or any bonus games that may be played based on events occurring in the base game.

At block 188, the controller 100 may modify other aspects of the game environment according to stored data. For example, the modifications to the game environment may include modifications to a background video image, to aural elements (speech, sound effects music, etc.), to the game speed, to the input device response characteristics, etc. The data may be stored in an environment preferences record and/or a personal data record, if separate records are generated and maintained; otherwise, the data may be stored in a single record.

Specifically, the color of the background may be changed, for example, from red to blue. As another example, a solid color background may be replaced with a photographic image, such as an image of a mountain range, lake or the like. Additionally, contrasting colors may be used according to the personal data record to permit the visually-challenged to view the video images more easily.

The aural elements—for example, speech, music and/or sound effects—may also be changed. For example, background music may be changed from classical to bluegrass, or to rock-and-roll. The background music clips may be uploaded from a portable memory device, such as a PDA, for use with the gaming unit 20, 30. Further, the volume of the speech, sound effects and/or music may be increased or decreased. Additionally, sound effects may be selected to cue the player to fact that certain buttons or other input devices have been activated.

The response characteristics of the input devices (such as the buttons of the control panel 66) may also be modified according to player preferences. For example, the input devices may be modified to decrease their responsiveness to manipulation, to discriminate between actual, desired manipulation of the input device and undesired, rapid manipulation of the input device. Alternatively, the input devices may be made "sticky," that is the input device (e.g., a button) is modified from a first mode wherein the input device toggles automatically between a depressed state and a released state, for example, and a second mode wherein the input device toggles and maintains either the depressed state or the released state until the player manually toggles the input device back to the other state. Moreover, the input device reaction time may be changed (e.g., slowed) to permit manipulation of the input device at a varied (e.g. decreased) rate relative to the norm to be recognized as a desired manipulation. It may also be possible for the player to select which input device from a variety of input devices to use (e.g. mouse as opposed to arrow keys).

Furthermore, messages and/or greetings displayed along with the game piece images, such as "Good Luck" or "Player 1," may be personalized using data from the personal data record. In such a case, the messages and/or greetings may be modified to read "Good Luck Mr. (Mrs./Ms.) X" and "Mr. (Mrs./Ms.) X."

Combinations of the forgoing modifications to the game environment and/or the game piece image may be included, for example, to make the gaming unit 20, 30 more accessible to the physically-, visually- and/or aurally-challenged. In the case of the visually-challenged, the dimensions of the game piece images may be increased as well as contrasting colors used for the game piece images and/or background images. For the aurally-challenged, captions may be used to communicate the speech and sound effects accompanying the game. Where the player is physically-challenged, changing the response characterisctics of the input devices may facilitate the player's communication with the gaming unit 20, 30, thereby limiting any frustration the player might normally experience as a consequence of his or her differences. A group identifier may be associated with the profile for each challenged-lifestyle category such that by entering a single identifier, stored on a card for example, into the gaming unit 20, 30, that gaming unit 20, 30 may be modified for the members of that group.

It will also be recognized that the color of the game piece images and/or the characteristics of the game environment may be used to identify the status of the player. For example, a gold or platinum trim to the playing cards/reels/keno or bingo cards or background could be used to reflect the player's status as a high-roller. Alternatively, special music and/or sound effects may be used. While the high roller status may merely be a data element associated with an identifier associated with a player, alternatively a group identifier may be associated with this profile and assigned to all members of the group.

As still further possibilities, the controller 100 may provide a personalized value payout or a personalized opportunity to receive a value payout at block 190 that is dependent upon the player's retrieved data.

The value payout may be in the form of a good (clothing, jewelry, etc.) or service (game play, travel, entertainment) that is selected according to information contained in a player's personal records. For instance, the player's personal record may include an entry that records the player's preferences for certain payouts (e.g. jewelry as opposed to clothing) or certain payout characteristics (e.g., clothing or jewelry sizes). The payout selection may alternatively be based on information regarding the player that is related to the payout (e.g., providing movies in DVD format to a player that has recently won a DVD player, or a Caribbean trip to a player that also has an interest in scuba diving).

The value payout may be personalized using information from the personal data record, such as the player's name. This payout personalization may be used to increase payout security where tickets or vouchers are provided by limiting the theft or other unlawful use and/or taking of another's payout vouchers and/or tickets. A payout may be provided independent of a game outcome, based instead on status ("high-roller") or in honor of a special occasion (birthday, anniversary, etc.).

The payout provided at block 190 may vary according to the location of the gaming unit 20, 30. For example, the controller 100 may control the printer 56 to generate a food and drink voucher if the player is proximate to a restaurant. Similarly, the controller 100 may control the printer 56 to generate a show ticket if the player is proximate to a theater. Also, the controller 100 may generate a coupon or ticket for use (e.g., redeemable for free credit, a jackpot multiplier, etc.) at a gaming unit at another location, thereby stimulating movement of the player to an idle area of the casino, for example.

The opportunity to receive a value payout may include changes in the, game play. For example, players participating in the player tracking program may be provided bonus play as a reward for participating in the player tracking program or as part of a promotional program. As another example, players participating in the player tracking program may be provided bonus play after a certain game event (such as completing a particular number of games). As a further example, a special pay table may be used during normal play to increase the chance that the player will be provide with a value payout, or a special multiplier may be used during normal play to increase the size of the value payout provided to the player. Alternatively, the player may receive an increased chance of receiving bonus play, a longer period of bonus play or bonus play using special pay tables or special multipliers. As another alternative, the player may receive special bonus play that is only offered to a limited group of players. As a still further alternative, the player may receive a bonus play game that is selected according to a player preference (e.g., normal play is video slots, but bonus play is video poker).

As yet another possibility, the controller 100 may control the display unit 70 to generate a video image at block 192 including words and graphics to convey a personalized greeting according to the personal data record associated with the identifier. In this regard, the personalized greeting may be a birthday greeting, a wedding greeting, and/or an anniversary greeting. Other greetings, such as a "welcome back" greeting may be included, as may be informative greetings which direct the player to his or her favorite game, theater, or restaurant and may include a map of the gaming establishment to assist in directing the player on his or her way.

It will further be recognized that while the foregoing modifications have been discussed with reference to a gaming unit 20 where the games and game environment is display principally on the display unit 70, the modifications selectable should not be understood to be limited to only to those that may be implemented where the game and game environment is displayed on a display unit 70. For example, similar modifications may be possible where mechanical reels are used exclusively, or in combination with a video display unit. In such circumstances, the player may be permitted to modify elements of the gaming unit such as the level and color of the backlighting used with the reels, for example, as well as the level and type of sound effects used and music played.

While the personalized operations 180, 182, 184, 186, 188, 190, 192 are shown in FIG. 4, these operations 180, 182, 184, 186, 188, 190, 192 intended to be illustrative, not limiting. A gaming unit 20, 30 may be programmed to offer the personalized operations shown in one or more of the blocks 180, 182, 184, 186, 188, 190, 192, may be programmed to offer only one of the personalized operations shown in blocks 180, 182, 184, 186, 188, 190, 192, or may be programmed to offer other personalized operations.

Further, the gaming unit 20 may perform the personalized operations shown in blocks 180, 182, 184, 186, 188, 190, 192 in a preselected (e.g., operator-or manufacturer-selected) combination or in a player-selected combination. This selection may occur separate from the programming of the personalized operations discussed above, or in combination therewith. For example, manufacturer or gaming system operator may decide that one or more of the gaming units 20 may perform only the personalized translation (block 184), the personalized display (186, 188) and/or the personalized greeting operations (block 192), and only those personalized operations are programmed into the gaming units 20, 30. Alternatively, the gaming units 20, 30 may be programmed with the operations 180, 182, 184, 186, 188, 190, 192 and the manufacturer or gaming system operator may be able to select only the operations 180, 182, 184, 186, 188, 190, 192 that they wish to offer to the players. As a further alternative, the player may be given the choice to select which of the personalized operations 180, 182, 184, 186, 188, 190, 192 will be performed during a particular game. In this case, the player may decide to have the display personalized and the textual content translated (to select operations of blocks 184, 186, 188), but may decide not to select the personalized wager (not to select the operation of block 182). As a further alternative, a combination of preselected and player-selected personalized operations may be offered. For example, the personalized greeting operation (block 192) may be preselected to be performed for all players that use the player tracking system, the player may be given his or her option to select the personalized game selection operation (block 180), the personalized wager operation (block 182), the personalized text translation operation (block 184) and/or the personalized display operation (blocks 186, 188). Furthermore, the gaming unit 20, 30 may not be programmed to perform other personalized operations.

Additionally, the player may be given the option to change the personalized operations performed during the play of a game (e.g., video poker, video slots, etc.). In fact, a player may select the personalization routines 180, 182, 184, 186, 188, 190, 192 prior to play of the game, after the game has started but before the game is complete (e.g., while the reels are still spinning or before all of the cards are dealt), or before the player selects a different game. The player may make changes before, during or after bonus play as well.

The gaming unit 20, 30 may perform one or more of the operations 180, 182, 184, 186, 188, 190, 192 continuously throughout the game, may perform one or more operations 180, 182, 184, 186, 188, 190, 192 when one or more events occur, or may perform one or more operations 180, 182, 184, 186, 188, 190, 192 when a particular game event occurs. That is, personalization of the background (block 188) may occur throughout the game, while personalization of greetings, game announcements, and the like (block 192) may be performed when certain events (e.g., point totals and/or times of day) occur and personalized offers like restaurant vouchers or show tickets (block 190) may only occur if a bonus is awarded. Alternatively, the background personalization (block 188) may change when certain events occur, such as change from normal play to bonus play or when a certain number of credits awarded is reached. Also, the player may have personalized sounds (sound effects, music, etc.) that change when certain game events occur.

The player may also wish discontinue the personalized operation routine. At block 194, a determination may be made that the player wishes to exit the personalized operation routine, for example, when the player depresses the "Cash Out" button 74. A further determination may be made at block 196 as to whether the player wishes to exit from personalized operation routine to the main routine (block 156). For example, the routine may determine that the player wishes to leave the gaming unit 20, 30 entirely if the "Cash Out" button 74 is depressed again within a time limit. If the "Cash Out" button 74 is not depressed again or not depressed within the time limit, the routine may proceed to the main routine at block 156. If the determination is made that the player wishes to leave the gaming unit 20, 30, the routine 130 may proceed to block 198, where the accumulated value is dispersed. The routine may end at block 200.

Main Routine

Figure 5:
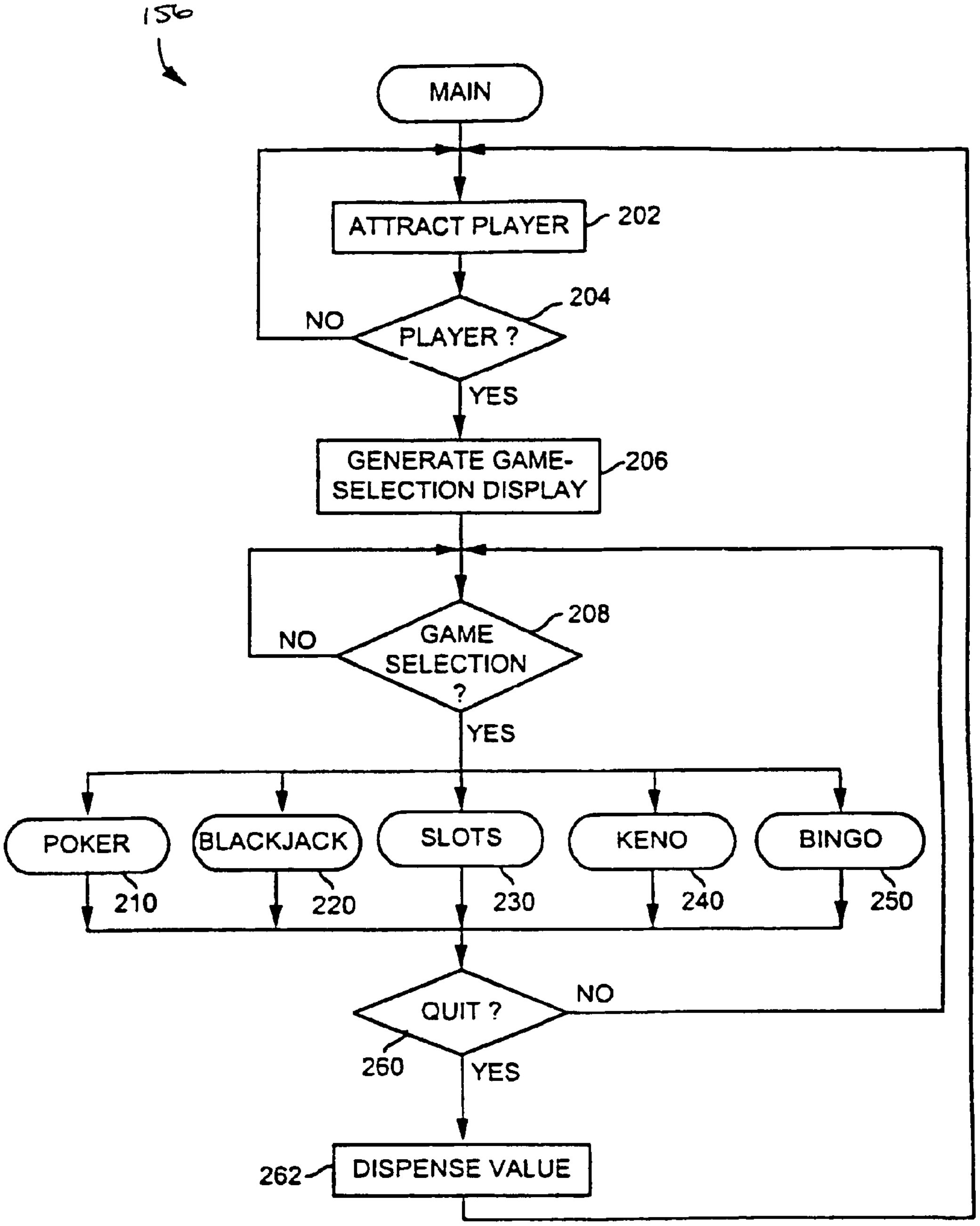
FIG. 5 is a flowchart of an embodiment of a main routine that may be performed during operation of one or more of the gaming units.

FIG. 5 is a flowchart of the main operating routine 156 shown schematically in FIG. 4, which routine 156 may be stored in the memory of the controller 100. Referring to FIG. 5, the main routine 156 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. Other games, such as pachinko, may also be included. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 5, a different number of routines could be included to allow play of a different number of games. The gaming unit 20 may also be programmed to allow play of different games.

Figure 6:
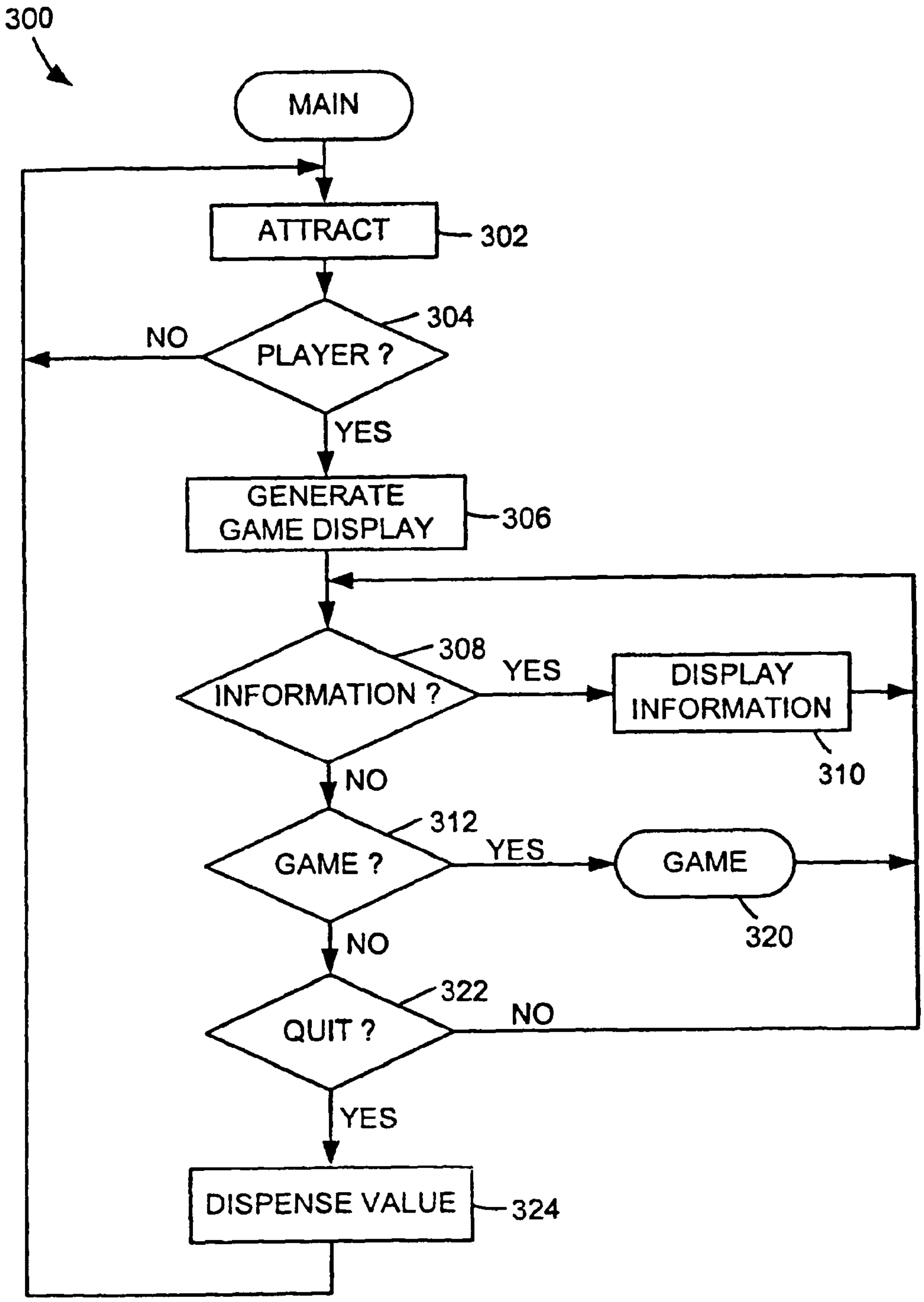
FIG. 6 is a flowchart of an alternative embodiment of a main routine that may be performed during operation of one or more of the gaming units.

FIG. 6 is a flowchart of an alternative main operating routine 300 that may be stored in the memory of the controller 100. The main routine 300 may be utilized for gaming units 20 that are designed to allow play of only a single game or single type of game. Referring to FIG. 6, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 7:
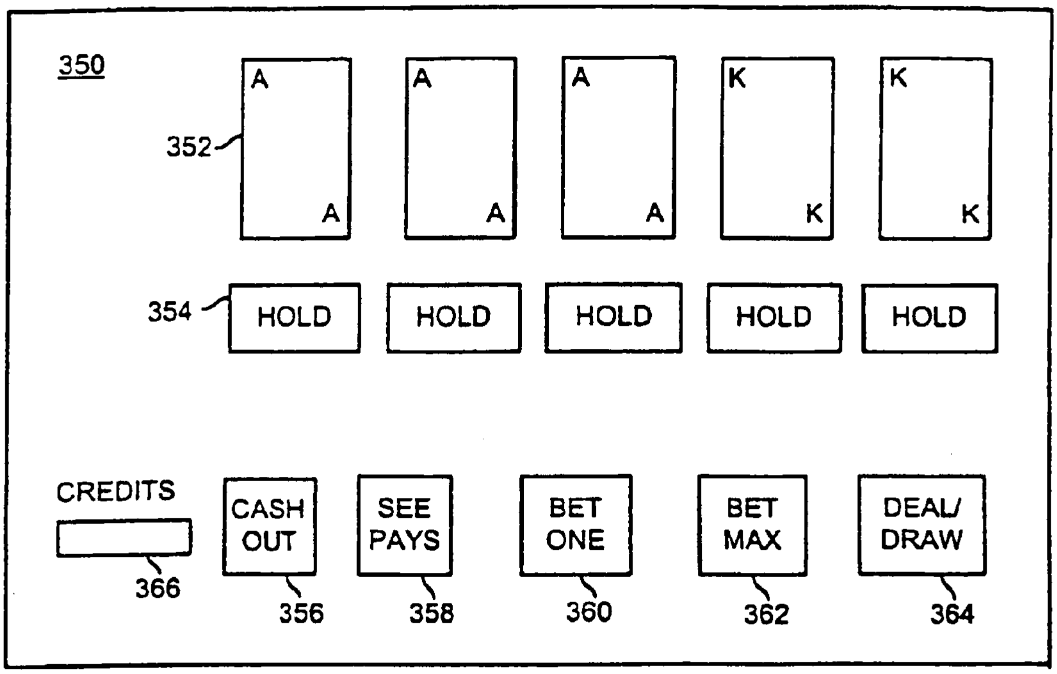
FIG. 7 is an illustration of an embodiment of a visual display that may be displayed during performance of the video poker routine of FIG. 9.

FIG. 7 is an exemplary display 350 that may be shown on the display unit 70 during performance of the video poker routine 210 shown schematically in FIG. 5. Referring to FIG. 7, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 9:
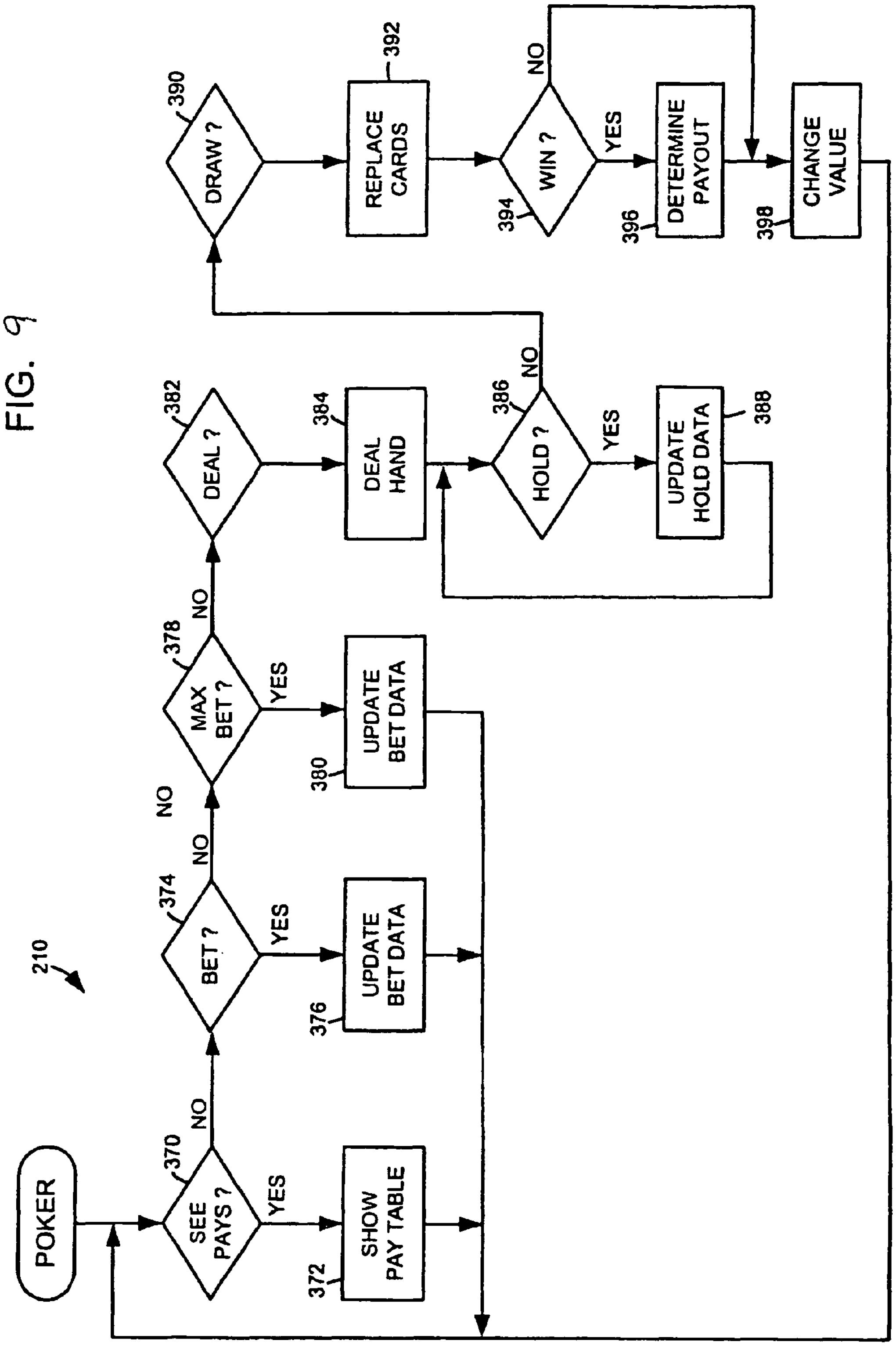
FIG. 9 is a flowchart of an embodiment of a video poker routine that may be performed by one or more of the gaming units.

FIG. 9 is a flowchart of the video poker routine 210 shown schematically in FIG. 5. Referring to FIG. 9, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 7).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 8:
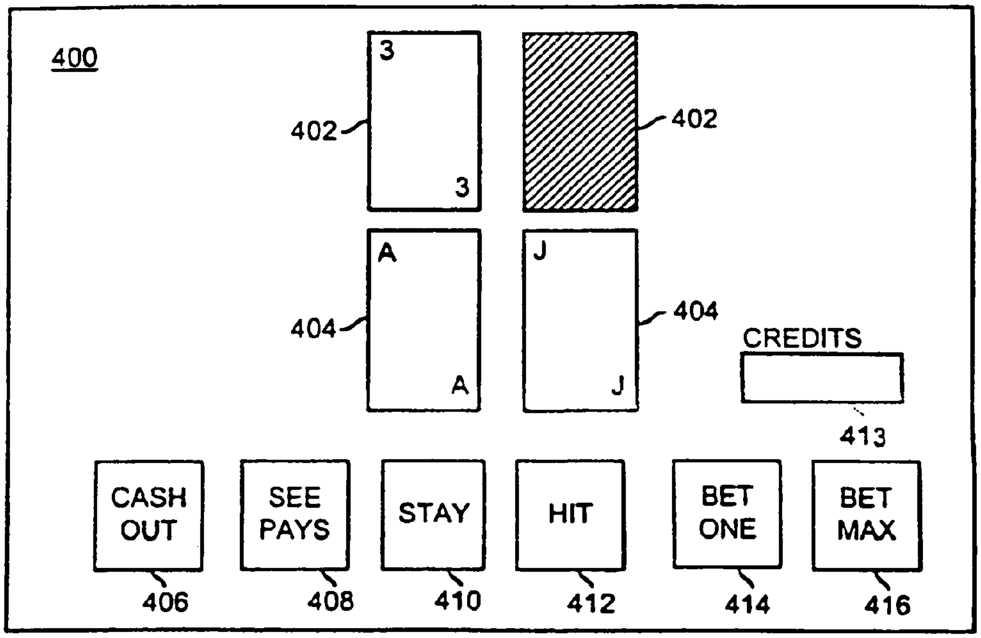
FIG. 8 is an illustration of an embodiment of a visual display that may be displayed during performance of the video blackjack routine of FIG. 10.

FIG. 8 is an exemplary display 400 that may be shown on the display unit 70 during performance of the video blackjack routine 220 shown schematically in FIG. 5. Referring to FIG. 8, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 10:
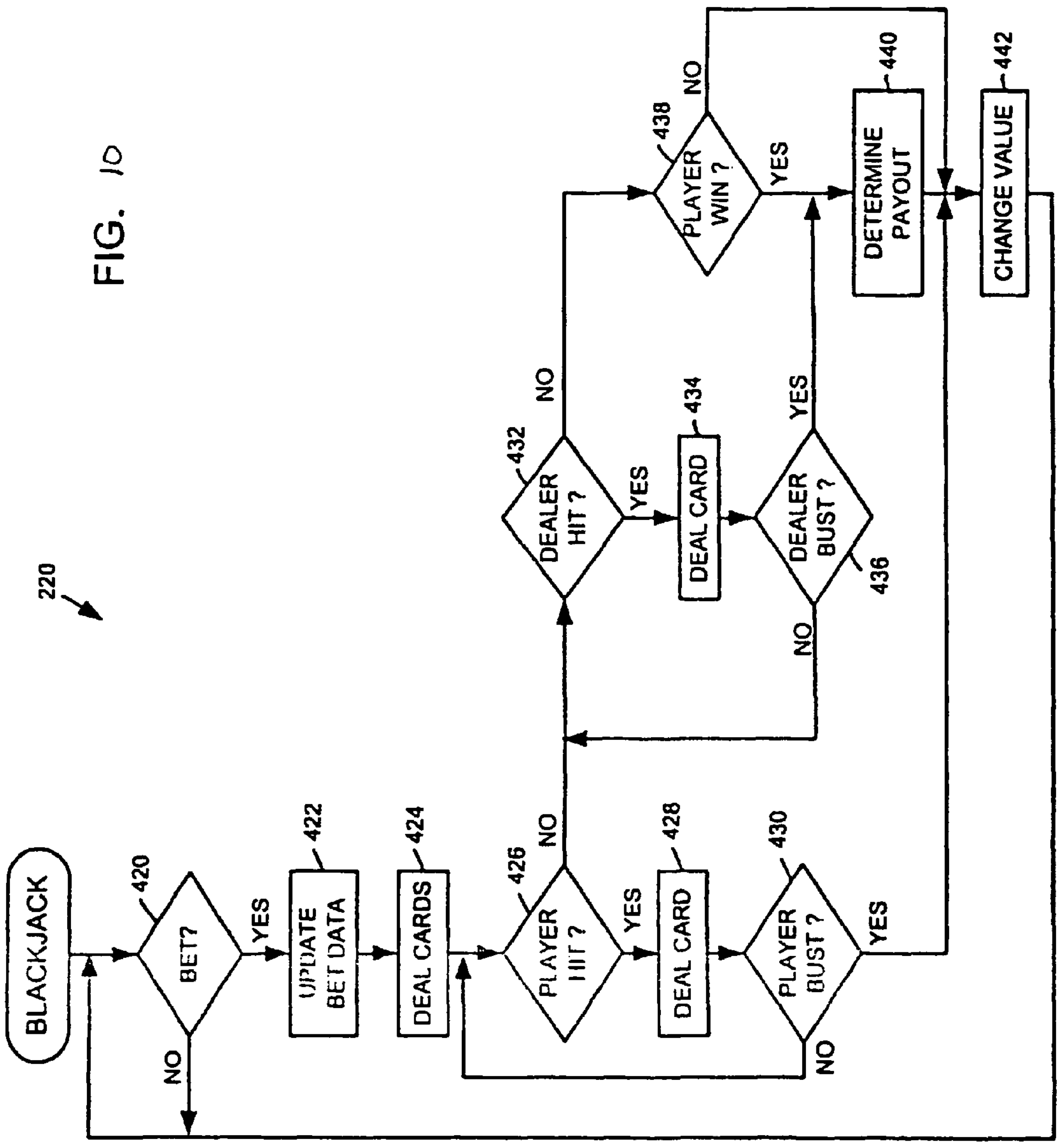
FIG. 10 is a flowchart of an embodiment of a video blackjack routine that may be performed by one or more of the gaming units.

FIG. 10 is a flowchart of the video blackjack routine 220 shown schematically in FIG. 5. Referring to FIG. 10, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not busted, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 8).

Slots

FIG. 11 is an exemplary display 450 that may be shown on the display unit 70 during performance of the slots routine 230 shown schematically in FIG. 5. Referring to FIG. 11, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 13:
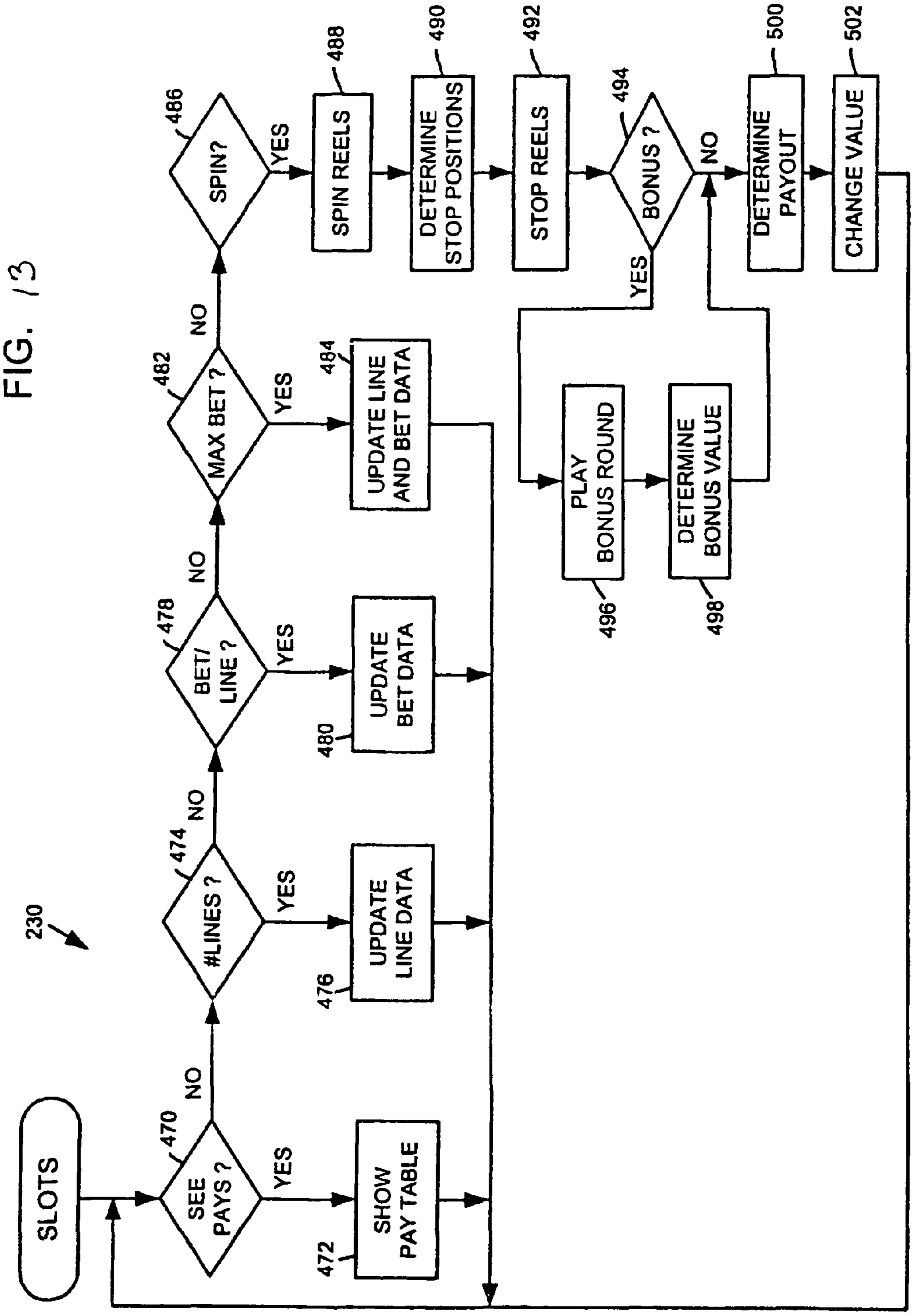
FIG. 13 is a flowchart of an embodiment of a slots routine that may be performed by one or more of the gaming units.

FIG. 13 is a flowchart of the slots routine 230 shown schematically in FIG. 11. Referring to FIG. 13, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 12 is an exemplary display 520 that may be shown on the display unit 70 during performance of the video keno routine 240 shown schematically in FIG. 5. Referring to FIG. 12, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 14:
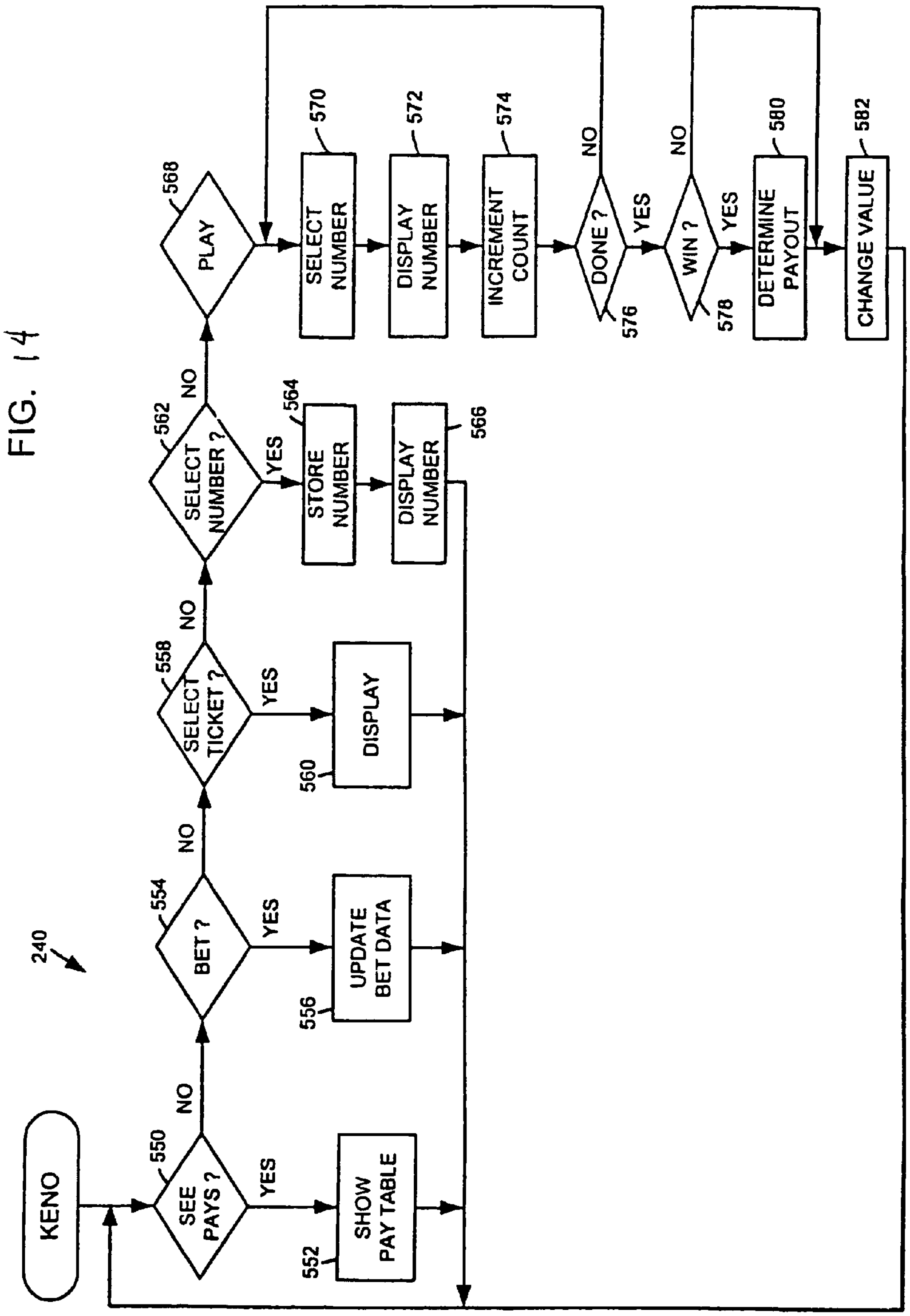
FIG. 14 is a flowchart of an embodiment of a video keno routine that may be performed by one or more of the gaming units.

FIG. 14 is a flowchart of the video keno routine 240 shown schematically in FIG. 5. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 14, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno card, and at block 560 the card may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the gaming system operator may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 12).

Video Bingo

Figure 15:
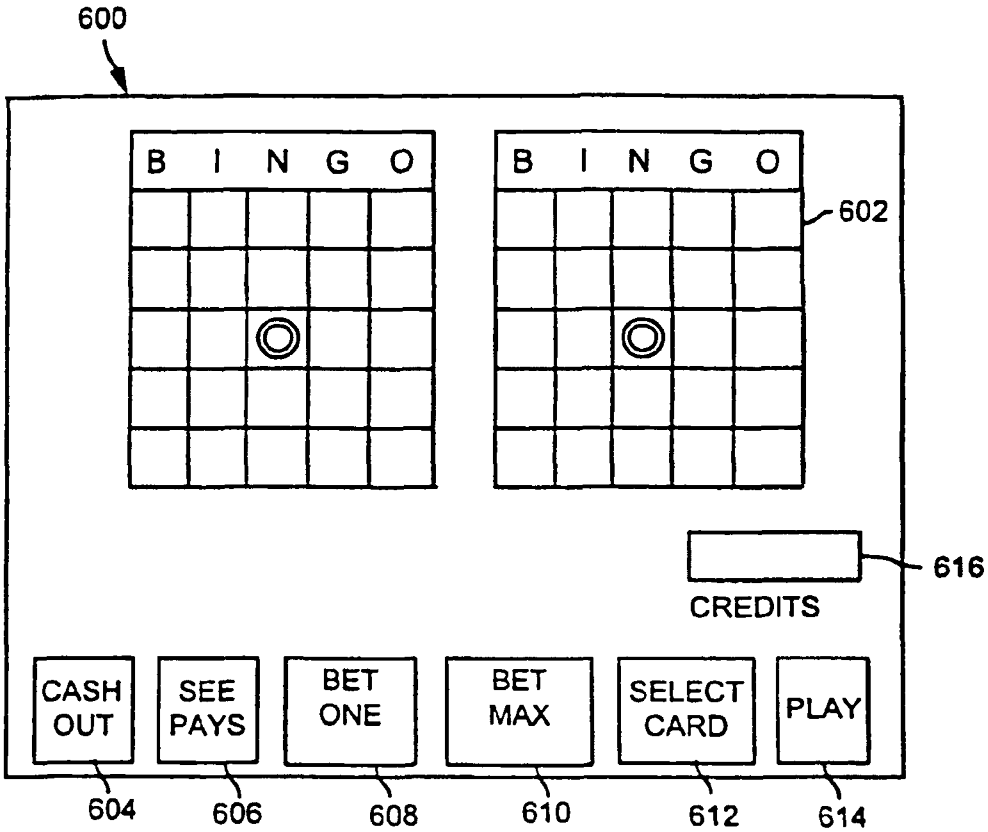
FIG. 15 is an illustration of an embodiment of a visual display that may be displayed during performance of the video bingo routine of FIG. 16.

FIG. 15 is an exemplary display 600 that may be shown on the display unit 70 during performance of the video bingo routine 250 shown schematically in FIG. 5. Referring to FIG. 15, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 16:
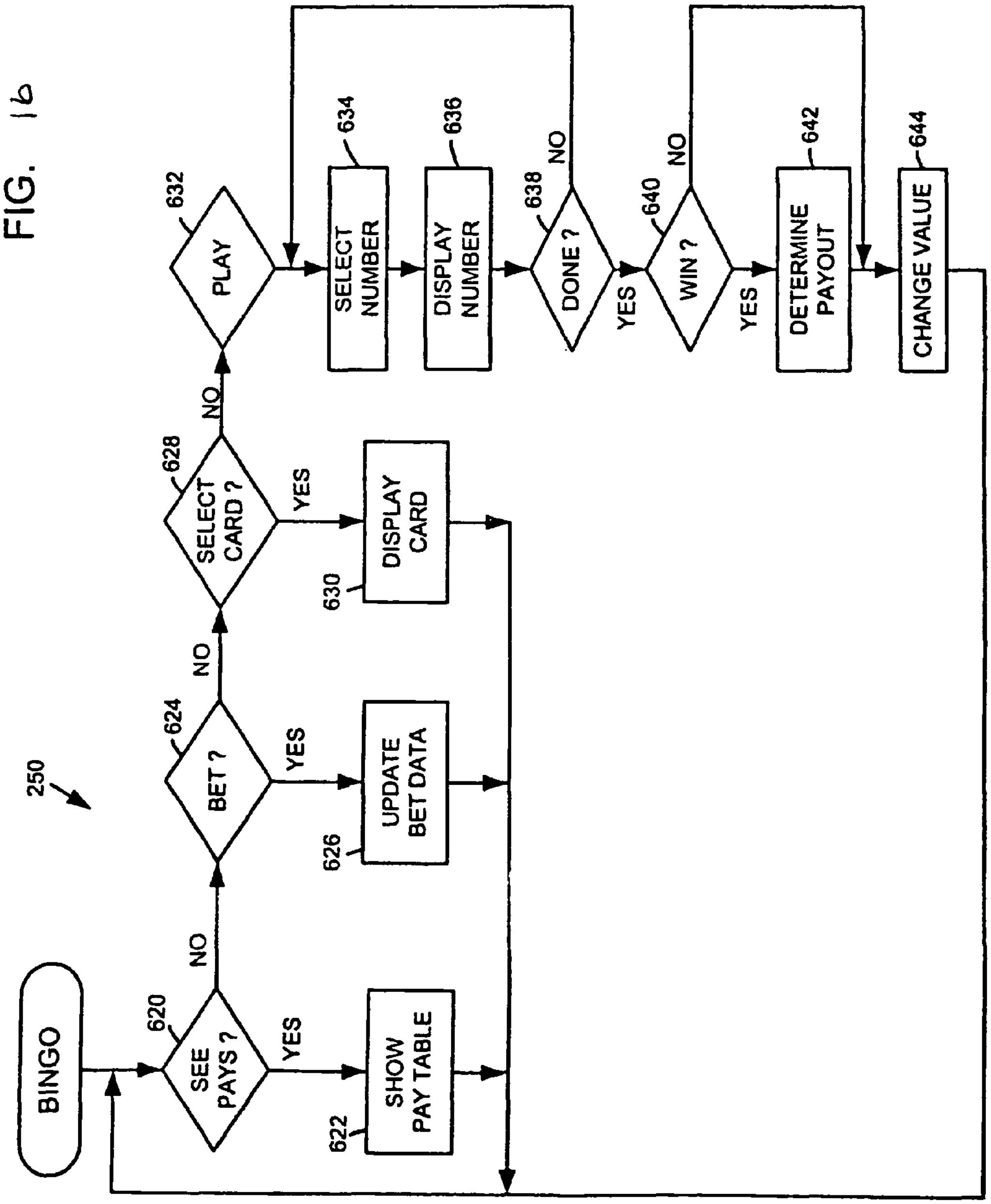
FIG. 16 is a flowchart of an embodiment of a video bingo routine that may be performed by one or more of the gaming units.

FIG. 16 is a flowchart of the video bingo routine 250 shown schematically in FIG. 5. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 16, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 15).

The invention claimed is:

1. A method of operating a gaming apparatus, said method comprising:

receiving at least one preference from a player regarding at least one of a game piece and a game environment including a background;

identifying the player;

accessing stored player data including the at least one preference;

performing a personalized gaming operation based on the stored player data including the at least one preference, the personalized gaming operation comprising at least one of the following personalized gaming operations:

generating a video image of the game piece, the game piece having one or more characteristics selected according to the stored player data including the at least one preference; or generating the game environment, the game environment including video images other than the video image of the game piece, music and sound effects and one or more of the video images other than the video image of the game piece, music and sound effects selected according to the stored player data including the at least one preference.

2. The method of operating a gaming apparatus according to claim 1, comprising:

causing a first video image representing one of video poker and video blackjack to be generated, the first video image comprising an image of a first playing card; and causing a second video image representing one of video poker and video blackjack to be generated, the second video image comprising an image of a second playing card differing from the first playing card as to at least one of card dimensions, face card appearance and card back appearance based on the stored player data.

3. The method of operating a gaming apparatus according to claim 1, comprising:

causing a first video image representing a video slots game to be generated, the first video image comprising an image of a first slot machine reel having slot machine symbols; and causing a second video image representing a video slots game to be generated, the second video image comprising an image of a second slot machine reel differing from the first slot machine reel as to at least one of reel dimensions, symbol appearance and symbol color based on the stored player data.

4. The method of operating a gaming apparatus according to claim 1, comprising:

causing a first video image representing a video keno game to be generated, the first video image comprising an image of a first keno card; and causing a second video image representing a video keno game to be generated, the second video image comprising an image of a second keno card differing from the first keno card as to at least one of card dimensions, card color and card background based on the stored player data.

5. The method of operating a gaming apparatus according to claim 1, comprising:

causing a first video image representing a video bingo game to be generated, the first video image comprising an image of a first bingo card if said game comprises video bingo; and causing a second video image representing a video bingo game to be generated, the second video image comprising an image of a second bingo card differing from the corresponding first bingo card as to at least one of card dimensions, card color and card background based on the stored player data.

6. The method of operating a gaming apparatus according to claim 1, the stored player data comprising a player name and the method comprising: causing a video image including a personalized message comprising the player name to be generated.

7. The method of operating a gaming apparatus according to claim 6, comprising: causing a video image including a personalized greeting comprising the player name to be generated.

8. The method of operating a gaming apparatus according to claim 1, wherein the background includes a first background, said method comprising:

causing a first video image other than a video image of a game piece to be generated, said first video image comprising the first background; and causing a second video image other than a video image of a game piece to be generated, said second video image comprising a second background, the second video image differing from the first video image as to background color based on the stored player data.

9. The method of operating a gaming apparatus according to claim 1, comprising:

causing a first plurality of musical notes to be generated; and causing a second plurality of musical notes to be generated, said second plurality of musical notes differing from the first plurality of musical notes based on the stored player data.

10. The method of operating a gaming apparatus according to claim 1, comprising:

causing a first sound effect to be generated; and causing a second sound effect to be generated, said second sound effect differing from the first sound effect based on the stored player data.

11. A method of operating a gaming apparatus, said method comprising:

identifying a player;

accessing stored player data relating to the player;

causing a first video image representing a game to be generated, said first video image comprising an image of a first game piece, said first video image comprising an image of a first playing card if said game comprises one of video poker and video blackjack, said first video image comprising an image of a first slot machine reel if said game comprises video slots, said first video image comprising an image of a first keno card if said game comprises video keno, said first video image comprising an image of a first bingo card if said game comprises video bingo, said first game piece including said first playing card, said first slot machine reel, said first keno card, or said first bingo card;

causing a second video image representing said game to be generated, said second video image being based on the stored player data, said second video image comprising an image of a second game piece, said second video image comprising an image of a second playing card differing from the first playing card as to at least one of card dimensions, face card appearance and card back appearance if said game represented by said second video image comprises one of video poker and video blackjack, said second video image comprising an image of a second slot machine reel differing from the first slot machine reel as to at least one of reel dimensions, reel symbol appearance and reel symbol color if said game represented by said second video image comprises video slots, said second video image comprising an image of a second keno card differing from the first keno card as to at least one of card dimensions, card color and card background if said game represented by said second video image comprises video keno, said second video image comprising an image of a second bingo card differing from the corresponding first bingo card as to at least one of card dimensions, card color and card background if said game represented by said second video image comprises video bingo, said second game piece including said second playing card, said second slot machine reel, said second keno card, or said second bingo card, said first video image having an image of a different first game environment including a background than an image of a second game environment of said second video image, said image of said first game environment is other than said image of said first game piece, and said image of said second game environment is other than said image of said second game piece.

12. A gaming system comprising:

a gaming apparatus comprising a video display unit, an identification device, and a payout device;

a computer operatively coupled to said gaming apparatus, said computer comprising a processor and a memory operatively coupled to said processor, said computer being programmed to receive at least one preference from a player regarding at least one of a game piece and a game environment including a background; said computer being programmed to identify the player; said computer being programmed to access stored player data including the at least one preference; and said computer being programmed to perform a personalized gaming operation based on the stored player data including the at least one preference, the personalized gaming operation comprising at least one of the following personalized gaming operations:

generating a video image of the game piece, the game piece having one or more characteristics selected according to the stored player data including the at least one preference; or generating the game environment, the game environment including video images other than the video image of the game piece, music and sound effects and one or more of the video images other than the video image of the game piece, music and sound effects selected according to the stored player data including the at least one preference.

13. The gaming system according to claim 12, said computer being programmed to cause a first video image representing a game to be generated on the video display unit, said first video image representing one of video poker and video blackjack and comprising an image of a first playing card; and said computer being programmed to cause a second video image representing a game to be generated on the video display unit, said second video image representing one of video poker and video blackjack and comprising an image of a second playing card differing from the first playing card as to at least one of card dimensions, face card appearance and card back appearance based on the stored player data.

14. The gaming system according to claim 12, said computer being programmed to cause a first video image representing a video slots game to be generated on the video display unit, the first video image comprising an image of a first slot machine reel having slot machine symbols; and said computer being programmed to cause a second video image representing a video slots game to be generated on the video display unit, the second video image comprising an image of a second slot machine reel differing from the first slot machine reel as to at least one of reel dimensions, symbol appearance and symbol color based on the stored player data.

15. The gaming system according to claim 12, said computer being programmed to cause a first video image representing a video keno game to be generated on the video display unit, the first video image comprising an image of a first keno card; and said computer being programmed to cause a second video image representing a video keno game to be generated on the video display unit, the second video image comprising an image of a second keno card differing from the first keno card as to at least one of card dimensions, card color and card background based on the stored player data.

16. The gaming system according to claim 12, said computer being programmed to cause a first video image representing a video bingo game to be generated on the video display unit, the first video image comprising an image of a first bingo card if said game comprises video bingo; and said computer being programmed to cause a second video image representing a video bingo game to be generated on the video display unit, the second video image comprising an image of a second bingo card differing from the corresponding first bingo card as to at least one of card dimensions, card color and card background based on the stored player data.

17. The gaming system according to claim 12, the stored player data comprising a player name: said computer being programmed to cause a video image to be generated on the video display unit, the video image including a personalized message comprising the player name.

18. The gaming system according to claim 17, said computer being programmed to cause a video image including a personalized greeting comprising the player name to be generated.

19. The gaming system according to claim 12, wherein the background includes a first background and the video image includes a first video image, said computer being programmed to cause the first video image other than a video image of a game piece to be generated on the video display unit, said first video image comprising the first background; and said computer being programmed to cause a second video image other than a video image of a game piece to be generated on the video display unit, said second video image comprising a second background, the second background differing from the first background as to background color based on the stored player data.

20. The gaming system according to claim 12, said computer being programmed to cause a first plurality of musical notes to be generated; and said computer being programmed to cause a second plurality of musical notes to be generated, said second plurality of musical notes differing from the first plurality of musical notes based on the stored player data.

21. The gaming system according to claim 12, said computer being programmed to cause a first sound effect to be generated; and said computer being programmed to cause a second sound effect to be generated, said second sound effect differing from the first sound effect based on the stored player data.

22. A gaming system comprising:

a gaming apparatus comprising a video display unit, an identification device, and a payout device;

a computer operatively coupled to said gaming apparatus, said computer comprising a processor and a memory operatively coupled to said processor, said computer being programmed to identify a player; said computer being programmed to access stored player data relating to the player; said computer being programmed to cause a first video image representing a game to be generated, said first video image comprising an image of a first game piece, said first video image comprising an image of a first playing card if said game comprises one of video poker and video blackjack, said first video image comprising an image of a first slot machine reel if said game comprises video slots, said first video image comprising an image of a first keno card if said game comprises video keno, said first video image comprising an image of a first bingo card if said game comprises video bingo; said first game piece including said first playing card, said first slot machine reel, said first keno card, or said first bingo card, and said computer being programmed to cause a second video image representing said game to be generated, said second video image being based on the stored player data, said second video image comprising an image of a second game piece, said second video image comprising an image of a second playing card differing from the first playing card as to at least one of card dimensions, face card appearance and card back appearance if said game represented by said second video image comprises one of video poker and video blackjack, said second video image comprising an image of a second slot machine reel differing from the first slot machine reel as to at least one of reel dimensions, reel symbol appearance and reel symbol color if said game represented by said second video image comprises video slots, said second video image comprising an image of a second keno card differing from the first keno card as to at least one of card dimensions, card color and card background if said game represented by said second video image comprises video keno, said second video image comprising an image of a second bingo card differing from the corresponding first bingo card as to at least one of card dimensions, card color and card background if said game represented by said second video image comprises video bingo, said second game piece including said second playing card, said second slot machine reel, said second keno card, or said second bingo card, said first video image having an image of a different first game environment including a background than an image of a second game environment of said second video image, said image of said first game environment is other than said image of said first game piece, and said image of said second game environment is other than said image of said second game piece.

23. A method of operating a gaming apparatus, said method comprising:

receiving at least one of:

a set including at least one of dimensions, color, and contrast of a video image of a game piece; and a set including at least one of color and contrast of a background video image;

identifying the player;

accessing stored player data including the at least one of:

the set of at least one of dimensions, color, and contrast of the video image of the game piece, and the set of at least one of color and contrast of the background video image;

performing a personalized gaming operation based on the stored player data, the personalized gaming operation comprising at least one of the following operations:

generating the video image of a game piece, the game piece having the at least one of dimensions, color and contrast selected according to the stored player data; and generating the background video image, the background video image having the at least one of color and contrast selected according to the stored player data.

24. The method according to claim 23, wherein the game piece image comprises at least one of the following: a player card, a slot reel, a keno card, and a bingo card.

25. The method according to claim 23, comprising wherein said generating the video image of the game piece comprises generating a video image of the game piece having colors and contrast selected to improve the visibility of the game piece image to visually-impaired players.

26. A gaming system comprising:

a gaming apparatus comprising a video display unit, an identification device, and a payout device;

a computer operatively coupled to said gaming apparatus, said computer comprising a processor and a memory operatively coupled to said processor, said computer being programmed to receive at least one preference from a player regarding at least one of a game piece and a background video image; said computer being programmed to identify the player; said computer being programmed to access stored player data including the at least one preference; and said computer being programmed to perform a personalized gaming operation based on the stored player data, the personalized gaming operation comprising at least one of the following operations:

generating a video image of the game piece, the game piece having at least one of dimensions, color and contrast selected according to the stored player data; and generating the background video image, the background video image having at least one of color and contrast selected according to the stored player data.

27. The gaming system according to claim 26, wherein the game piece comprises at least one of the following: a player card, a slot reel, a keno card, and a bingo card.

28. The gaming system according to claim 26, wherein the video image having of the game piece has colors and contrast selected to improve the visibility of the game piece to visually-impaired players.

29. A method of operating a gaming apparatus, said method comprising:

identifying a player;

accessing stored player data relating to the player;

performing a personalized gaming operation based on the stored player data, the personalized gaming operation comprising generating a video image including textual captions corresponding to at least one aural element according to the stored player data, wherein the textual captions are used to communicate the at least one aural element.

30. The method according to claim 29, wherein the at least one aural element comprises at least one of the following aural elements: speech, sound effects, and music.

31. A gaming system comprising:

a gaming apparatus comprising a video display unit, an identification device, and a payout device;

a computer operatively coupled to said gaming apparatus, said computer comprising a processor and a memory operatively coupled to said processor, said computer being programmed to identify a player; said computer being programmed to access stored player data relating to the player; and said computer being programmed to perform a personalized gaming operation based on the stored player data, the personalized gaming operation comprising: generating a video image including textual captions corresponding to at least one aural element according to the stored player data, wherein the textual captions are used to communicate the at least one aural element.

32. The gaming system according to claim 31, wherein the at least one aural element comprises at least one of the following aural elements: speech, sound effects, and music.

* * * * *